United States Patent
Murata et al.

(10) Patent No.: US 7,286,600 B2
(45) Date of Patent: Oct. 23, 2007

(54) DATA TRANSMISSION METHOD AND DATA TRANSMISSION DEVICE

(75) Inventors: Hiroyasu Murata, Kawasaki (JP); Takashi Kaku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 784 days.

(21) Appl. No.: 10/620,819

(22) Filed: Jul. 16, 2003

(65) Prior Publication Data

US 2004/0042391 A1 Mar. 4, 2004

(30) Foreign Application Priority Data

Aug. 27, 2002 (JP) .............................. 2002-246840

(51) Int. Cl.
  *H04L 27/00* (2006.01)
(52) U.S. Cl. ...................................... 375/259; 370/210
(58) Field of Classification Search ................ 375/259, 375/260, 285, 295–296; 370/210, 203
See application file for complete search history.

(56) References Cited

U.S. PATENT DOCUMENTS

| | | | |
|---|---|---|---|
| 5,995,567 A | 11/1999 | Cioffi et al. | |
| 6,014,412 A | 1/2000 | Wiese et al. | |
| 6,035,000 A | 3/2000 | Bingham | |
| 6,404,830 B2 | 6/2002 | Wiese et al. | |
| 6,449,324 B2 | 9/2002 | Wiese et al. | |
| 6,456,673 B1 | 9/2002 | Wiese et al. | |
| 6,487,253 B1 * | 11/2002 | Jones et al. | 375/260 |
| 6,597,745 B1 * | 7/2003 | Dowling | 375/296 |
| 6,614,864 B1 * | 9/2003 | Raphaeli et al. | 375/371 |
| 6,657,950 B1 * | 12/2003 | Jones et al. | 370/208 |
| 2002/0001340 A1 | 1/2002 | Shenoi et al. | |
| 2002/0114270 A1 | 8/2002 | Pierza et al. | |

FOREIGN PATENT DOCUMENTS

| | | |
|---|---|---|
| EP | 1 073 241 | 1/2001 |
| JP | 2000-201131 | 7/2000 |
| JP | 2000-509578 | 7/2000 |

OTHER PUBLICATIONS

European Search Report dated Dec. 18, 2003, for European Patent Application 03 01 5653.

* cited by examiner

*Primary Examiner*—Khanh Tran
(74) *Attorney, Agent, or Firm*—Katten Muchin Rosenman LLP

(57) ABSTRACT

A power line carrier communication system can effectively reduce leak electromagnetic field generation. Transmission data is copied on a frequency axis, and vector multiplication of a finite-difference function is performed to insert either a zero signal or an inverted signal between original signals.

16 Claims, 25 Drawing Sheets

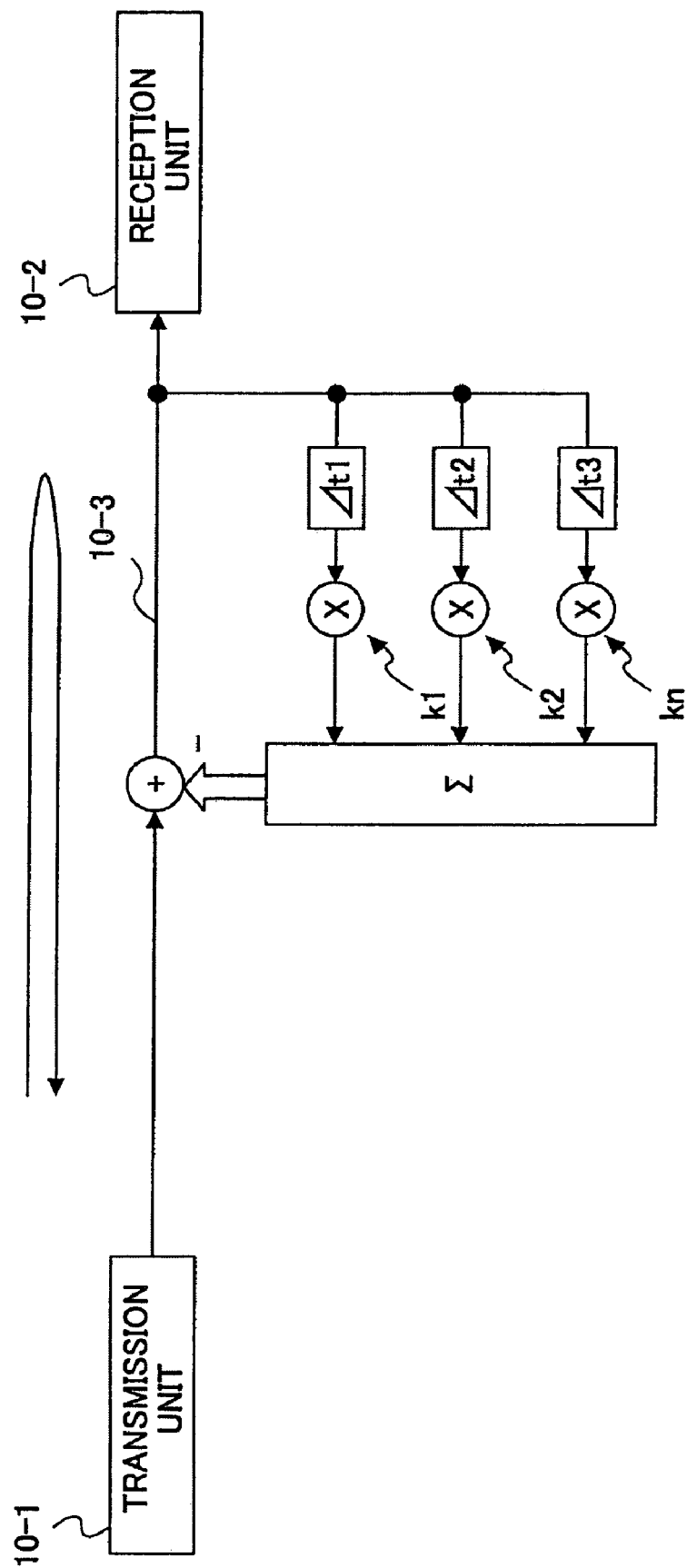

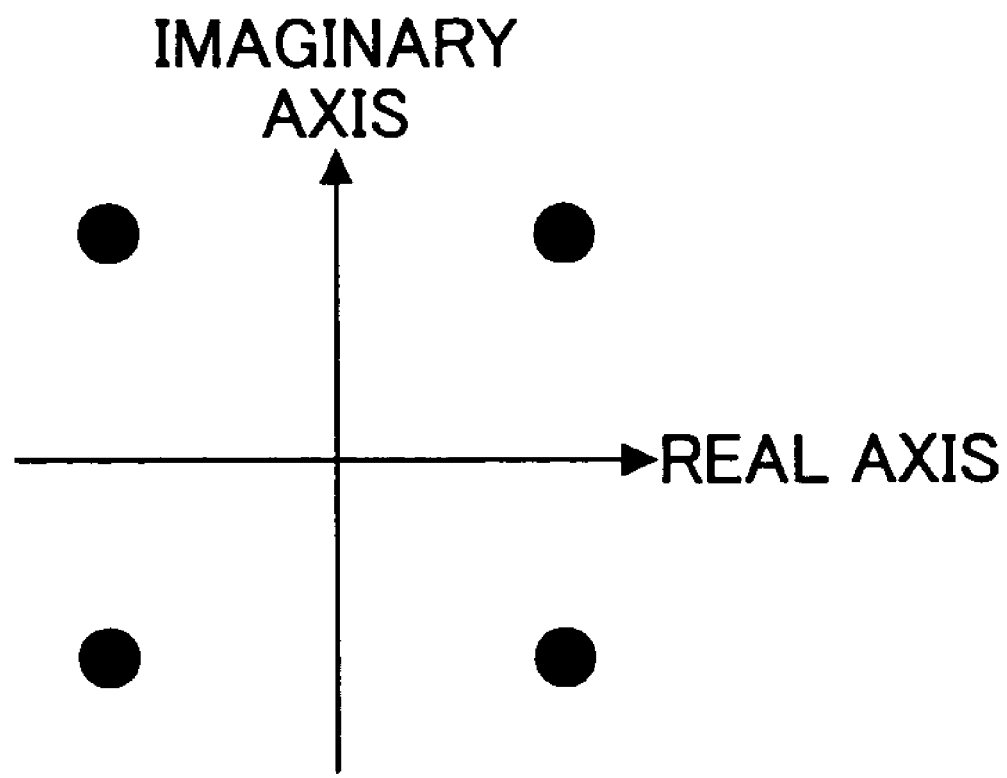

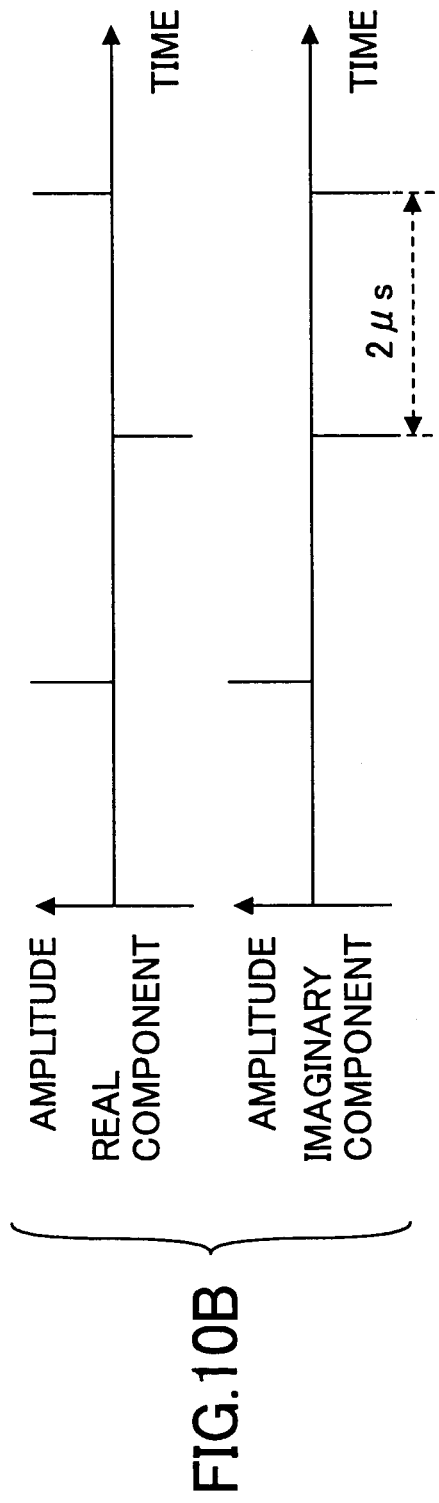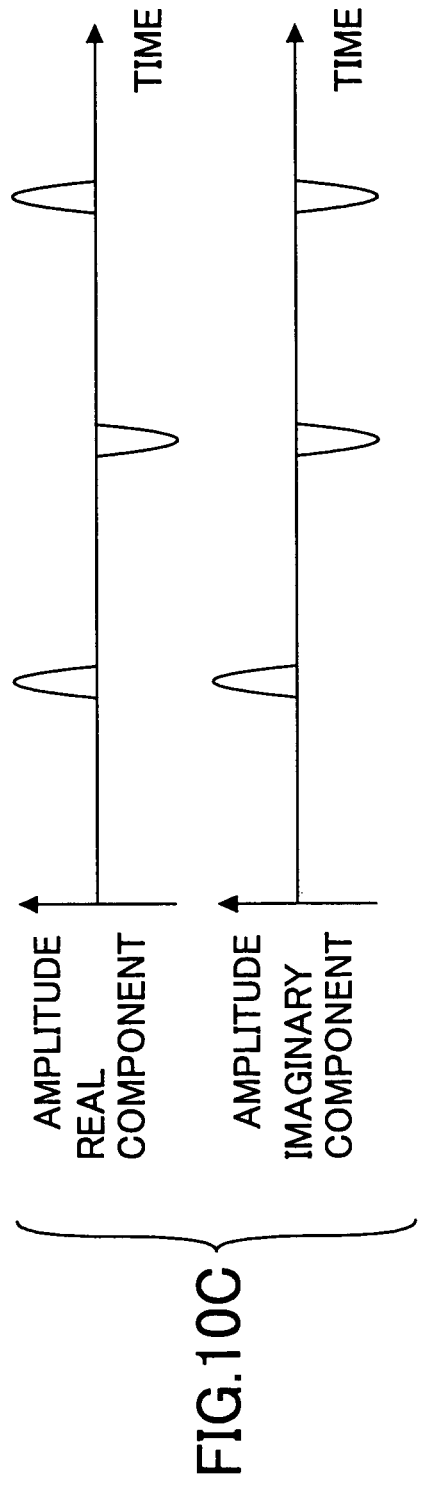

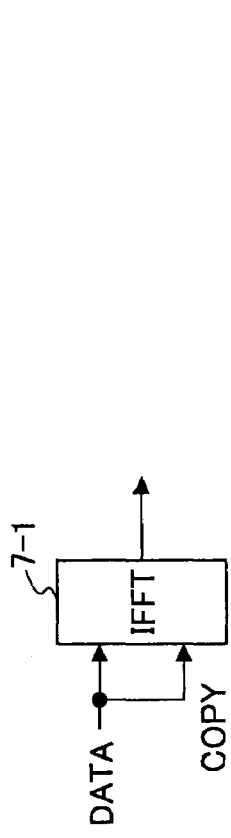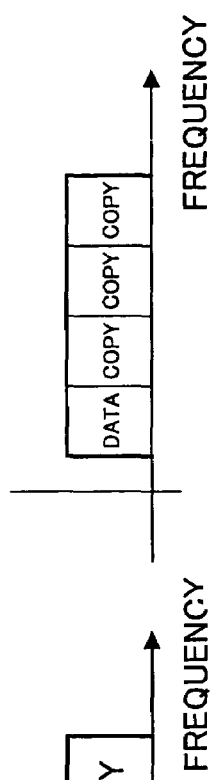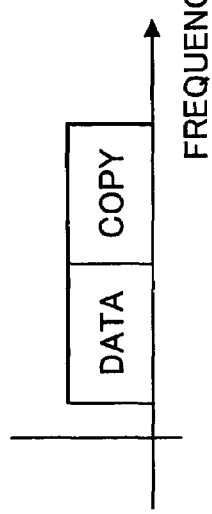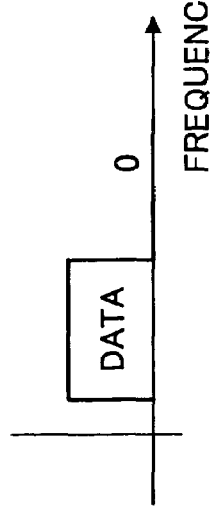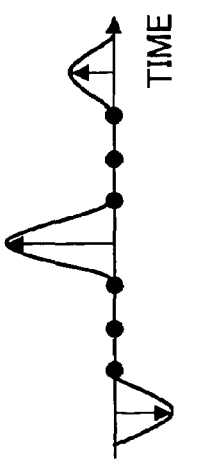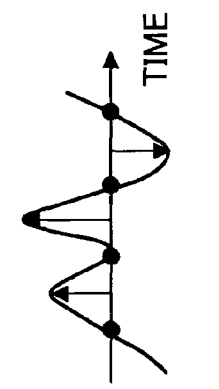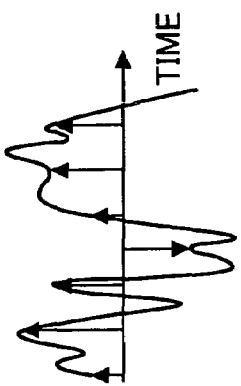

DATA TRANSMISSION METHOD AND DATA TRANSMISSION DEVICE

BACKGROUND OF THE INVENTION

1. Field of the Invention

The present invention relates to a data transmission method and a data transmission device. Specifically, the present invention relates to a data transmission method and a data transmission device that can be applied to a power line carrier communication modem and the like for high speed data communication using a power line, wherein a leak electromagnetic field (electromagnetic wave) that is radiated from the power line at the time of signal transmission can be suppressed. That is, the present invention relates to a data transmission method and a data transmission device that have a function of suppressing a leak electromagnetic field to reduce a noise applied to other receivers, while signal transmission is performed therethrough.

2. Description of the Related Art

FIG. 1 shows an example of a configuration of a power line carrier communication system. In this example, a power line includes a high-voltage distribution power line 9-2 of 6.6 kV provided between a power distribution transformer substation 9-1 and a pole transformer 9-3, and a 100V/200V low-voltage power distribution line 9-4 and a service line 9-5 provided between the pole transformer 9-3 and a house 9-6.

In this power line carrier communication system, an optical fiber is provided between an access node 9-11 of the power distribution transformer substation 9-1 and a modem inside the pole transformer 9-3 so as to enable data transmission with an optical signal. Further, data transmission can be performed between the pole transformer 9-3 and a modem of the house 9-6 whose plug is inserted into an outlet of the house 9-6, via the low-voltage power distribution line 9-4, the service line 9-5, and wiring 9-7 in the house 9-6.

Plural home electric appliances are connected to the low-voltage power distribution line 9-4, the service line 9-5, and the wiring 9-7, so that switching power sources and inverter circuits of these home electric appliances randomly generate noises to deteriorate communication quality in the above data transmission. For this reason, the following techniques are applied. That is, an FM modulation method, an FSK modulation method, a PSK modulation method, a spectrum diffusion method, and the like that are robust against noises are used. Alternatively, a multi-carrier modulation method, OFDM (Orthogonal Frequency Division Multiplexing), and the like are introduced to perform communication while avoiding use of carrier bands having many noises.

Meanwhile, in such a power line carrier communication system, a radiated leak electromagnetic field generated from the power line at the time of the signal transmission can adversely affect broadcasting media or other communications. Particularly, the noises can adversely affect a receiver for short-wave broadcasting to deteriorate quality in a voice of the broadcasting.

In order to reduce deterioration of the quality of the other communications caused by the radiated leak electromagnetic field, the transmission level in the power line carrier communication may be lowered. However, when the transmission level in the power line carrier communication is lowered, communication quality in the power line carrier communication is substantially lowered by noises generated from the switching sources and the inverters of the various home electric appliances.

Furthermore, there are many branching points on the power line. Accordingly, multi-paths (that are described hereinafter) are formed, so that a transmission signal of a particular frequency is reflected at the branching point, and the reflected signal is returned to the transmitter with the reflected signal having the opposite phase. FIG. 2 shows an equivalent circuit of the power line in which the reflected waves are generated by the multi-paths. In FIG. 2, the reference number 10-1 designates a transmission unit of the modem of the pole transformer, and the reference number 10-2 designates a reception unit of the modem of the house. The pole transformer modem transmission unit 10-1 is connected to the house modem reception unit 10-2 by the power line 10-3 having many branching points.

The "n" number of reflected waves that are generated by the reflection at many branching points spend respective delay times $\Delta t1$ through $\Delta tn$, and then are returned to the power line at the side of the pole transformer modem transmission unit 10-1 to be combined. With respect to a transmission signal of a certain frequency, the reflected wave and the carrier wave of the transmission signal overlap to generate a point where a voltage value becomes zero, that is, a point where the impedance becomes zero. Accordingly, at this point, a large current signal flows to generate a large leak electromagnetic field.

Furthermore, in the power line carrier communication system, a low-voltage power distribution line can function as an inductor for the pole transformer modem, and a service line and wiring in a house can function as a condenser for the pole transformer modem. In addition, a noise preventing condenser of each home electronic appliance connected to the wiring in the house is provided between AC 100V lines, so that each home electric appliance generates a large capacitance load.

Accordingly, for the pole transformer modem, the power line can function as a series resonance circuit including an output impedance, i.e., including R, L, and C. FIG. 3A shows this equivalent circuit of the power line from the viewpoint of the pole transformer modem. FIG. 3B shows frequency characteristics of a signal current flowing in the power line.

In FIG. 3A, R designates the output impedance of the pole transformer modem, L designates an inductor of the low-voltage power distribution line, and C designates a condenser produced by the service line and the wiring in the house. R, C, and L constitute the series resonance circuit. The series resonance circuit takes the lowest impedance when a frequency is the resonance frequency $f0=1/\{2\pi\sqrt{(L-C)}\}$. As shown in FIG. 3B, the signal having this resonance frequency causes a large current to flow, so that a large leak electromagnetic field wave is generated.

Furthermore, the power line becomes a distributed constant circuit, and branching circuits form a plurality of series resonance circuits that have different resonance frequencies, respectively. FIGS. 4A and 4B show a plurality of resonance points in the range of the frequency band of the transmission signal. In other words, FIGS. 4A and 4B show the change in the impedance and the flowing current that depend on a frequency value. As shown in FIGS. 4A and 4B, the impedance takes minimum values at several points indicated by the arrows in FIGS. 4A and 4B. Accordingly, at the minimum values of the impedance, the current takes maximum values to generate a large leak electromagnetic wave.

Furthermore, each branching circuit functions as an antenna. For example, when the resonance frequency is 30 MHz, the transmission speed of the radio wave becomes $3\times10^8$ [m/s], and the wave length of the radio wave becomes 10 m. As shown in FIG. 5, a node is generated at intervals of the half wave length that is 5 m. At each node, the maximum current or the maximum voltage is generated.

In addition, frequencies having values that are integral multiples of the resonance frequency also cause the resonance. Accordingly, large leak electromagnetic fields are generated at intervals of half wave lengths of these resonance frequencies. Since the electric home appliance has capacity load, a large electromagnetic field is generated at intervals of the half wave length of the resonance frequency larger than about 100 kHz.

SUMMARY OF THE INVENTION

Accordingly, it is a general object of the present invention to provide a data transmission method and a data transmission device for suppressing a leak electromagnetic field. Specifically, in the data transmission method and the data transmission device, at the time of transmitting a signal by a communication line such as a power line, a telephone line, and a coaxial transmission line that generates a reflected wave, a large current caused by the reflected wave and caused by intersymbol interference can be prevented from flowing to suppress the leak electromagnetic field.

According to one aspect of the present invention, there is provided a method of transmitting data, comprising the steps of:
  (a) performing predetermined processing on transmission data on a frequency axis such that a zero signal and/or an inverted signal is inserted between transmission signals of the transmission data on a time axis; and
  (b) transforming the transmission data processed in the step (a) into a time-axis signal.

According to another aspect of the present invention, the step (a) comprises the step (c) of performing the predetermined processing on the transmission data on the frequency axis such that the inverted signal and at least one zero signal point are inserted between the transmission signals on the time axis.

According to another aspect of the present invention, the step (a) comprises the step (d) of copying the transmission data on the frequency axis, and the step (b) comprises the step (e) of processing the transmission data and the copied transmission data in parallel.

According to another aspect of the present invention, the step (a) comprises the step (f) of performing the predetermined processing on the transmission data such that the transmission signal of the transmission data is delayed by a predetermined time, and the delayed transmission signal is subtracted from the transmission signal.

According to another aspect of the present invention, the method further comprises the step (g) of decreasing a roll-off rate of frequency characteristics in the processing of the step (f).

According to another aspect of the present invention, the step (b) comprises the step (h) of transforming the transmission data processed in the step (a) into the time-axis signal by using inverse fast Fourier transform processing.

According to another aspect of the present invention, the step (d) comprises the step (i) of determining a first number of points that are assigned to the transmission data such that data of both the transmission data and the copied transmission data corresponds to a second number of points that is a number of carriers used in the inverse fast Fourier transform processing.

According to another aspect of the present invention, the step (d) comprises the step (j) of adjusting the number of times of copying the transmission data, the number of times of copying being the number of times of generating transmission data by copying the transmission data.

According to another aspect of the present invention, there is provided a data transmission device, comprising:
  frequency-axis processing means for performing predetermined processing on transmission data on a frequency axis such that a zero signal and/or an inverted signal is inserted between transmission signals of the transmission data on a time axis; and
  time-axis transform means for transforming the transmission data processed by the frequency-axis processing means into a time-axis signal.

According to another aspect of the present invention, the frequency-axis processing means perform the predetermined processing on the transmission data on the frequency axis such that the inverted signal and at least one zero signal point are inserted between the transmission signals of the transmission data on the time axis.

According to another aspect of the present invention, the frequency-axis processing means comprise copying means for copying the transmission data on the frequency axis, and the time-axis transform means process the transmission data and the copied transmission data in parallel.

According to another aspect of the present invention, the frequency-axis processing means comprise delay finite-difference means for delaying the transmission signal, and subtracting the delayed transmission signal from the transmission signal.

According to another aspect of the present invention, the delay finite-difference means use a decreased roll-off rate of frequency characteristics in the frequency-axis processing means.

According to another aspect of the present invention, the time-axis transform means transform the transmission data processed by the frequency-axis processing means into the time-axis signal by using inverse fast Fourier transform processing.

According to another aspect of the present invention, the copying means determine a first number of points that are assigned to the transmission data such that data of both the transmission data and the copied transmission data corresponds to a second number of points that is a number of carriers used in the inverse fast Fourier transform processing.

According to another aspect of the present invention, the copying means adjust the number of copies of the transmission data generated by the copying means.

Thereby, before the data on the frequency axis can be transformed into the data on the time axis by an inverse fast Fourier transform process and the like, the zero point inserting process or the inverted signal point inserting process can be performed. Furthermore, the number of signal points to which the transmission data is assigned can be determined such that the data obtained after the zero point inserting process or the inverted signal point inserting process agrees with the number (the carrier number) of the points that are used when the data on the frequency axis is transformed into the data on the time axis. Accordingly, the configuration for transforming the data on the frequency axis into the data on the time axis can be made so as to process the fixed number of the points, resulting in the simplified configuration.

Therefore, with the simple configuration, it is possible to provide a data transmission method in which the leak electromagnetic field suppressing effect can be controlled, and the leak electromagnetic field can be effectively suppressed.

Other objects, features, and advantages of the present invention will become more apparent from the following detailed description when read in conjunction with the accompanying drawings.

BRIEF DESCRIPTION OF THE DRAWINGS

FIG. 2 is an illustration for reflected wave generation caused by multi-paths in the system as shown in FIG. 1;

FIGS. 10A through 10C show a signal shape in the modem configuration shown in FIG. 9;

FIGS. 17A through 17H are illustrations for the zero point inserting effect achieved by a copying unit according to the first embodiment of the present invention;

DETAILED DESCRIPTION OF THE PREFERED EMBODIMENTS

First, the related technique disclosed in Japanese Patent Application No. 2002-015098 (Title of the invention is "Leak Electromagnetic Field Suppressing Method, Leak Electromagnetic Field Suppressing Transmission Method, and Apparatus") filed by the applicant of the present application in the Japanese Patent Office on Jan. 24, 2002 will be described. This technique will be described with reference to FIGS. 6A through 6D.

Figure 6A:
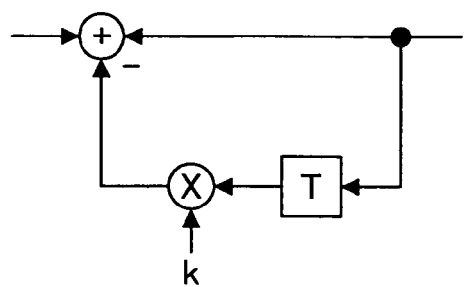
FIGS. 6A through 6D show the configuration and the effect according to a first embodiment of the present invention.

As describe above, a power line becomes an equivalent circuit as shown in FIG. 6A due to a branching circuit. Consecutively transmitted signals and the reflected and returned signals that are generated by the reflection of the transmitted signals are combined while the reflected signals have the opposite phases of those of the transmission signals. With this combination of the transmission signals and the reflected signals, maximum currents are generated at several points. The width (period) of the thus-generated impulse response wave in the power line becomes about 2 μs at most, for example.

Figure 6B:
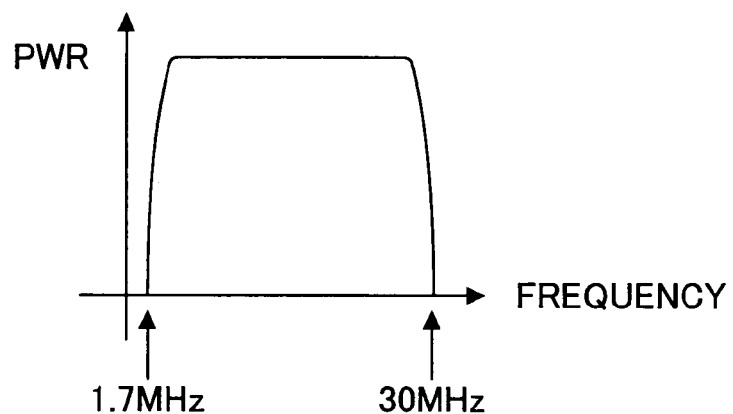
Figure 6C:
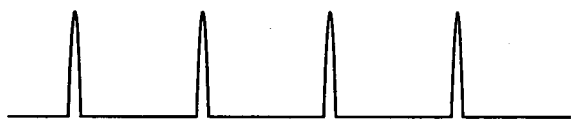
Figure 6D:
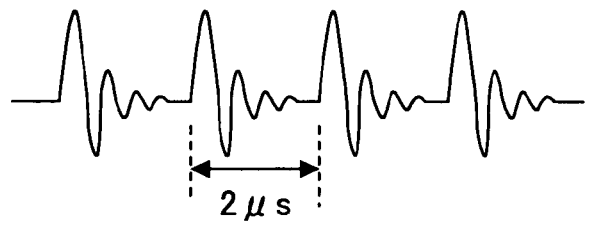

In the transmission band ranging from 1.7 MHz to 30 MHz as shown in FIG. 6B, the impulse corresponding to the transmission data is transmitted at the intervals of 2 μs, as shown in FIG. 6C. In this manner, it is possible to prevent interference of the reflected waves having the opposite phases, as shown in FIG. 6D. Accordingly, it is possible to prevent the phenomenon in which the transmission signals and the interference signals overlap to generate the voltage of zero. That is, it is possible to prevent a large current from flowing, and to suppress a leak electromagnetic field.

Figure 7:
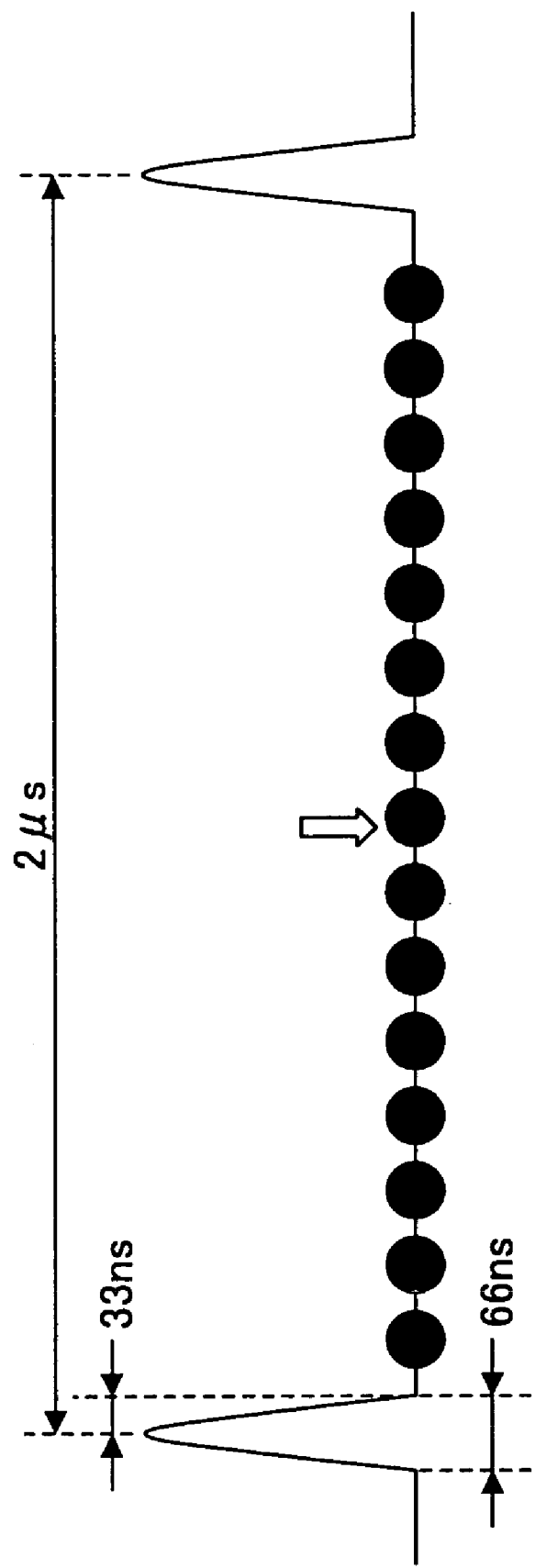
FIG. 7 is an illustration for a zero point inserting process according to the first embodiment of the present invention.

Furthermore, as shown in FIG. 7, Nyquist transmission of the impulse is performed by the high band region (e.g., 30 M baud) that is allowed in the power line. Zero points indicated by the filled circles of FIG. 7 are provided at the Nyquist intervals (e.g., about 33 ns) between the impulses, as shown in FIG. 7. Furthermore, the impulses are transmitted at the intervals that are the impulse response periods (about 2 μs) of the power line, in order to prevent respective impulse responses from overlapping. In this manner, it is possible to suppress the reflected wave interference and the intersymbol interference, and to prevent a large current from flowing, reducing a leak electromagnetic field.

Furthermore, a first impulse is transmitted, and a second impulse having a phase (inverted phase) that is shifted from the phase of the first impulse by 180 degrees is then transmitted so as to reduce the reflected waves and suppress a leak electromagnetic field. This leak electromagnetic field suppression is shown in FIGS. 8a through 8F.

Figure 8:
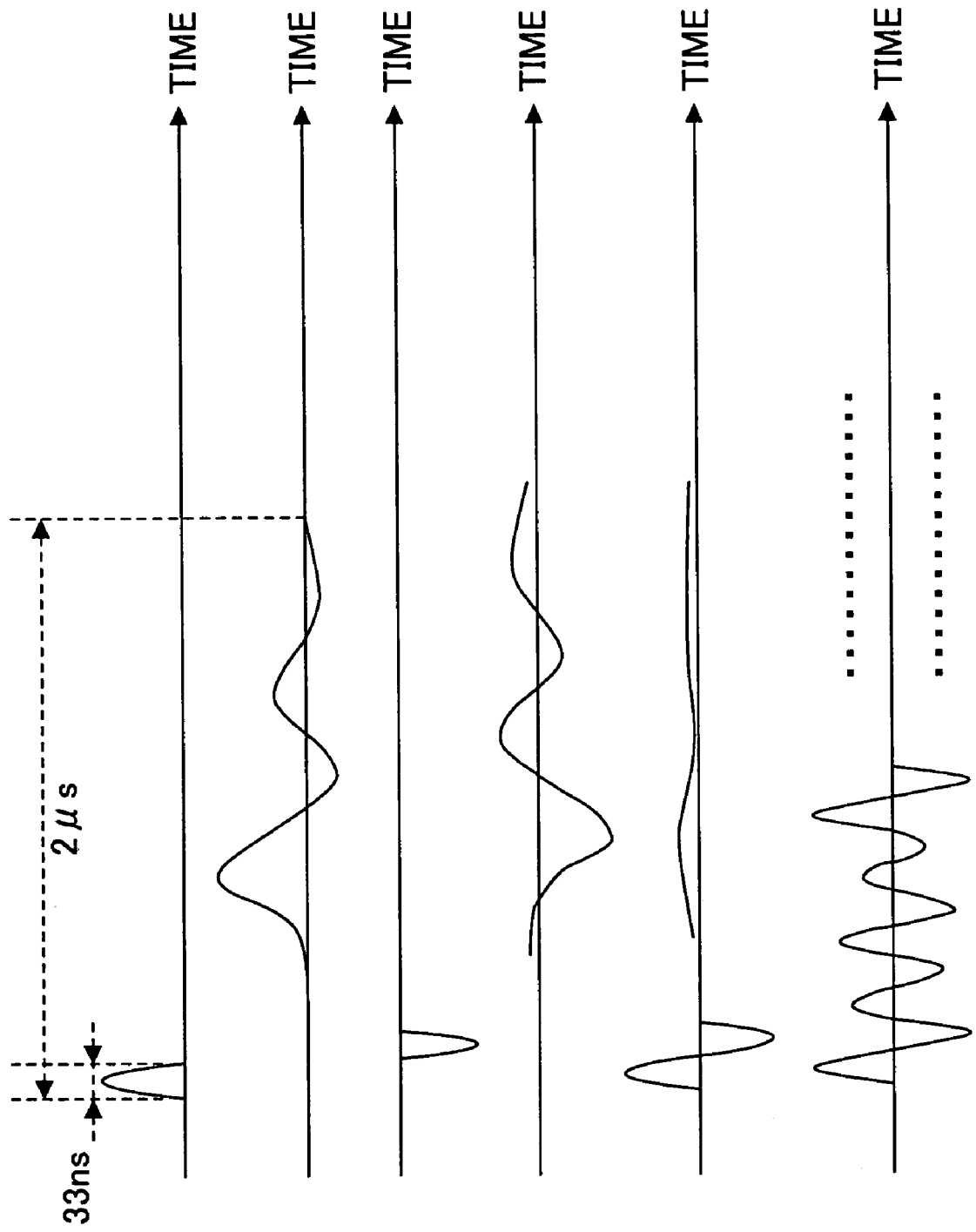
FIGS. 8A through 8F show the effect obtained by the zero point inserting process according to the first embodiment of the present invention.

When the first impulse is transmitted as shown in FIG. 8A, the reflected wave generated by the first impulse is returned as shown in FIG. 8B. For this reason, a second impulse having the phase that is shifted from the phase of the first impulse by 180 degrees is transmitted as shown in FIG. 8C immediately after the first impulse is transmitted. As a result, as shown in FIG. 8D, the reflected wave generated by the reflection of the second impulse is returned with this reflected wave appearing to have an inverted wave shape of the reflected wave (shown in FIG. 8B) of the first impulse.

The reflected wave shape of the first impulse and the reflected wave shape of the second impulse are inverted from each other to negate each other, so that a leak electromagnetic field generated by the reflected wave can be reduced, as shown in FIG. 8E. FIG. 8F shows the wave shape formed when the first impulses and the second impulses having the phases shifted from those of the first impulses by 180 degrees immediately after the first impulses are alternately and consecutively transmitted. Also in this case, a polarity of the reflected waves of the consecutively transmitted impulses is consecutively inverted, so that the reflected waves negate each other to reduce the leak electromagnetic field.

Figure 9:
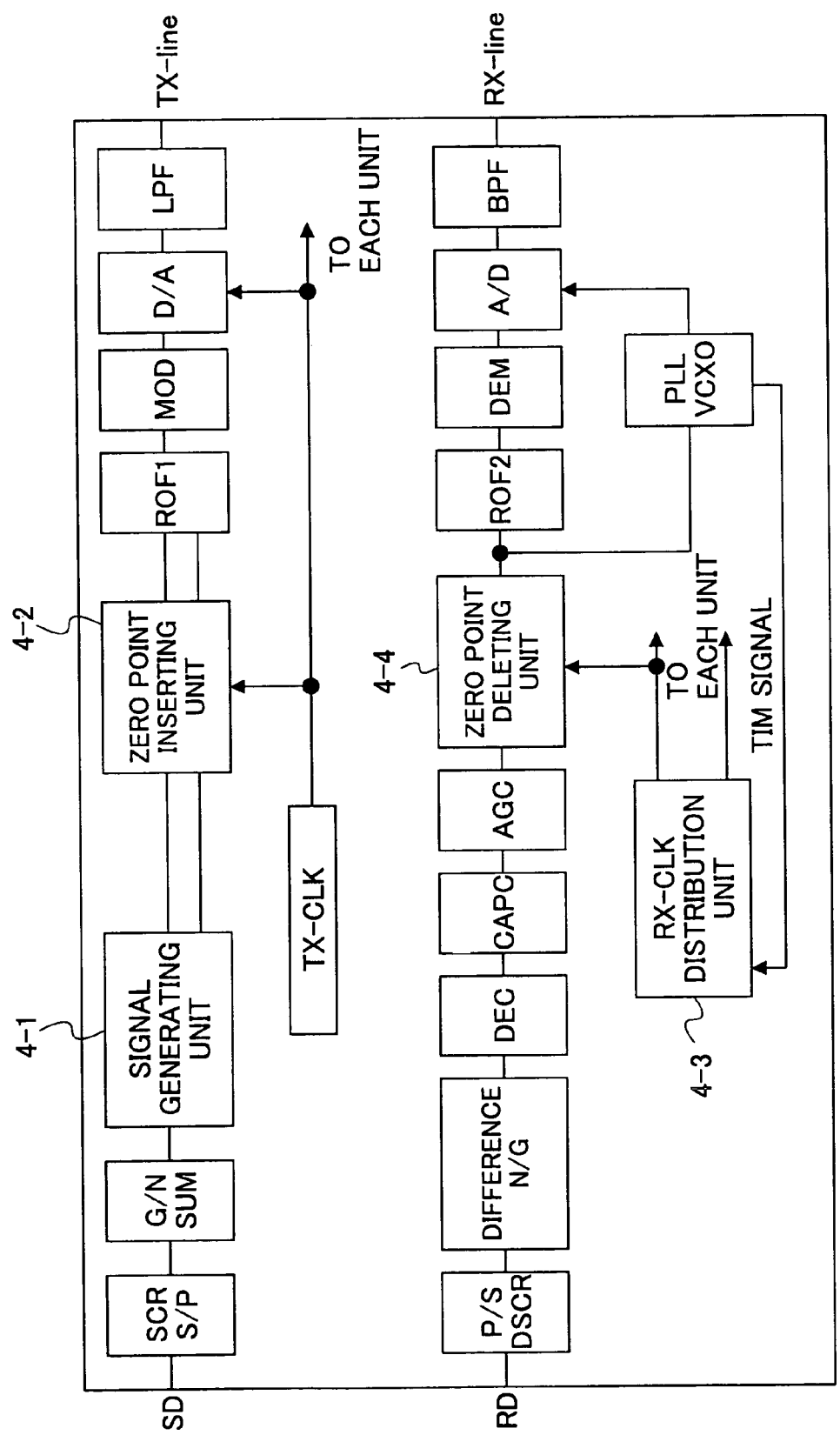
FIG. 9 shows one example of the modem configuration related to the present invention.

FIG. 9 shows an example of a configuration of a pole transformer modem to which a method of transmitting impulses at impulse response intervals disclosed in the above Japanese Patent Application is applied. In FIG. 9, a scrambler (SCR S/P) performs a scrambling process on a transmission signal SD, converts a serial signal into a parallel signal, and outputs the parallel signal to a vector sum circuit (G/N sum).

The vector sum circuit performs signal conversion from a Gray binary code G into a natural binary code (N) on the input parallel signal. Further, the vector sum circuit performs a vector sum operation corresponding to a vector difference circuit (difference N/G) used at the reception side for detecting a phase, and outputs the processed signal to a signal point generation unit 4-1.

The signal point generation unit 4-1 divides the transmission data into data groups each having a predetermined bit number by a predetermined modulation unit, and generates one signal point corresponding to this bit number. For example, when the transmission data is divided by two bits, the signal point generation unit 4-1 generates one signal point out of signal points whose number is $2^2=4$, as shown in FIG. 10A.

As shown in FIG. 10B, these signal points are generated as impulses of real parts and imaginary parts. These impulses are generated at intervals (e.g., 2 μs) for which the reflected wave well vanishes. A zero point inserting unit 4-2 inserts a zero point signal between one transmission signal and the next transmission signal, and a roll-off filter (ROF1) limits the band to a band allowed in a power line carrier communication, and adjusts the wave shape. Thereafter, as shown in FIG. 10C, the transmission signal is output.

The thus-output transmission signal is modulated by a modulation circuit (MOD), and is converted from a digital signal into an analog signal by a D/A converter (D/A). Thereafter, a low pass filter (LPF) extracts a signal of a low frequency band including a frequency band of the power line carrier wave, and outputs the extracted signal to a transmission line (TX-line).

A corresponding modem receives, via a reception line (RX-line), the transmission signal output to the transmission line (TX-line). Next, a band pass filter (BPF) extracts only predetermined frequency band components, and an A/D converter (A/D) converts the signal into the digital signal.

This digitalized reception signal is converted into a signal of a baseband by a demodulation circuit (DEM), and the wave shape of this signal is then adjusted by a roll-off filter (ROF2). Thereafter, the roll-off filter outputs the signal to a VCXO (Voltage Controlled Crystal Oscillator) type phase lock loop circuit (PLL VCXO).

This VCXO type phase lock loop circuit extracts the phase of the zero point, and provides the phase of the zero point as a sampling timing signal to the A/D converter (A/D) and to a clock (RX-CLK) distribution unit 4-3 of the reception unit.

The zero point of the signal output from the roll-off filter (ROF2) of the reception unit is deleted by a zero point deleting unit 4-4, and the gain of the signal is then controlled to be a predetermined level by an automatic gain controlling unit (AGC). Thereafter, an automatic carrier phase controlling unit (CAPC) aligns the phase. Furthermore, a determining circuit (DEC) performs signal determination of the reception signal, and outputs a result of the signal determination to a vector difference circuit (difference N/G).

This vector difference circuit performs a vector difference operation on the signal corresponding to the signal output with the natural binary code (N) by the vector sum circuit (G/N) of the transmission unit. Then, this vector difference circuit returns the code to the Gray binary code (G), and outputs this signal to a descrambler (P/S DSCR). The descrambler (P/S DSCR) converts this parallel gray code into a serial signal to perform a descrambling process so as to obtain a reception signal (RD).

Furthermore, in the transmission unit, a transmission clock distribution circuit (TX-CLK) distributes the transmission clock signal to the zero point inserting unit 4-2, the D/A converter (D/A), and other transmission circuit units. In the reception unit, a reception clock (RX-CLK) distribution unit 4-3 extracts a reception clock signal from the VCXO type phase lock loop circuit (PLL VCXO), and distributes the extracted reception clock signal to the zero point deleting unit 4-4, and other reception circuit unit.

The reception clock (RK-CLK) distribution unit 4-3 only passes the sampling timing signal that indicates the phase of the zero point and is extracted from the VCXO type phase lock loop circuit (PLL VCXO). This sampling timing signal is a mere symbol timing signal.

Figure 11:
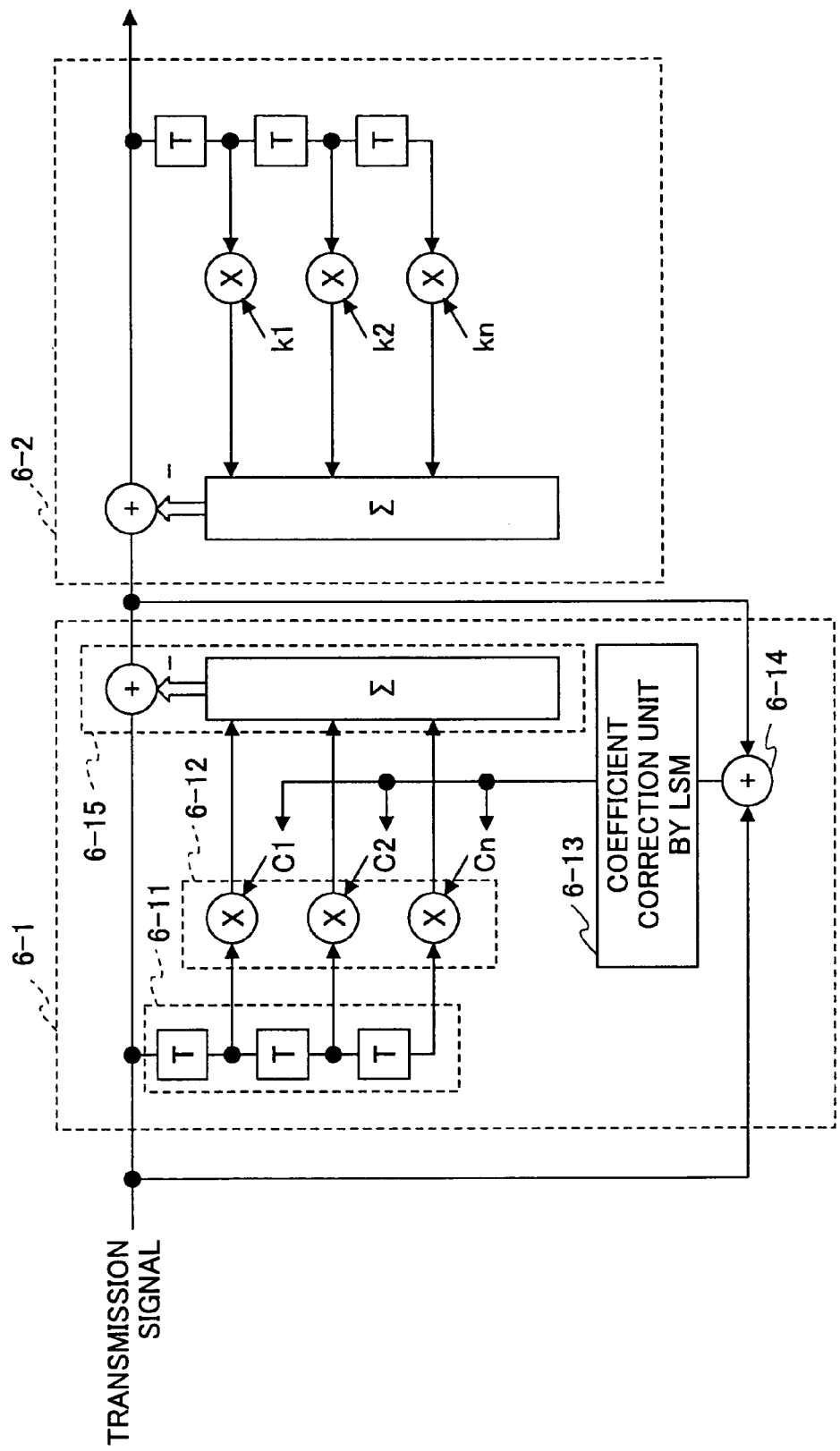
FIG. 11 shows an example of a multi-path unit (a finite-difference function unit) according to the first embodiment of the present invention.

FIG. 11 shows a configuration for negating reflected waves by multi-path equalizing according to the above Japanese Patent Application. With this configuration, a transmission signal is transmitted to a communication line 6-2 of a power line via a multi-path equalizing unit 6-1 in a pole transformer modem. In the communication line 6-2, the "n" number of reflected waves that return by the reflection at many branching points after respective delay times are combined, as shown in FIG. 2. Accordingly, a transfer function of the communication line 6-2 is:

$$1/(1+k_1 \times Z^{-1} + k_2 \times Z^{-2} + \ldots + k_n \times Z^{-n}).$$

The multi-path equalizing unit 6-1 is configured so as to include a filter of a transfer function that is the inverse function of the transfer function of the communication line 6-2 so that the modem of the pole transformer can negate the reflected waves. That is, a FIR (Finite Pulse Response) filter whose transfer function is "$1+C_1 \times Z^{-1}+C_2 \times Z^{-2}+ \ldots +C_n \times Z^{-n}$" is used as the filter of the multi-path equalizing unit 6-1.

The multi-path equalizing unit 6-1 includes the "n" number of delay elements 6-11 corresponding to estimated maximum delay times, and a multiplying unit 6-12 that multiplies, by predetermined coefficients, respective output from the "n" number of the delay elements 6-11. The multi-path equalizing unit 6-1 further includes a coefficient correction unit 6-13 that calculates and corrects each coefficient by a least square method (LSM), and an error calculating unit 6-14 that compares the input transmission signal with the output transmission signal to output an error signal generated based on this comparison to the coefficient correcting unit 6-13. The multi-path equalizing unit 6-1 further includes a combining adding unit 6-15 that adds the combined signal to the transmission signal with the phase of the combined signal being opposite. This combined signal is generated by combining the respective signals that are produced by multiplying the output from the respective delay elements by the respective predetermined coefficients.

Figure 1:
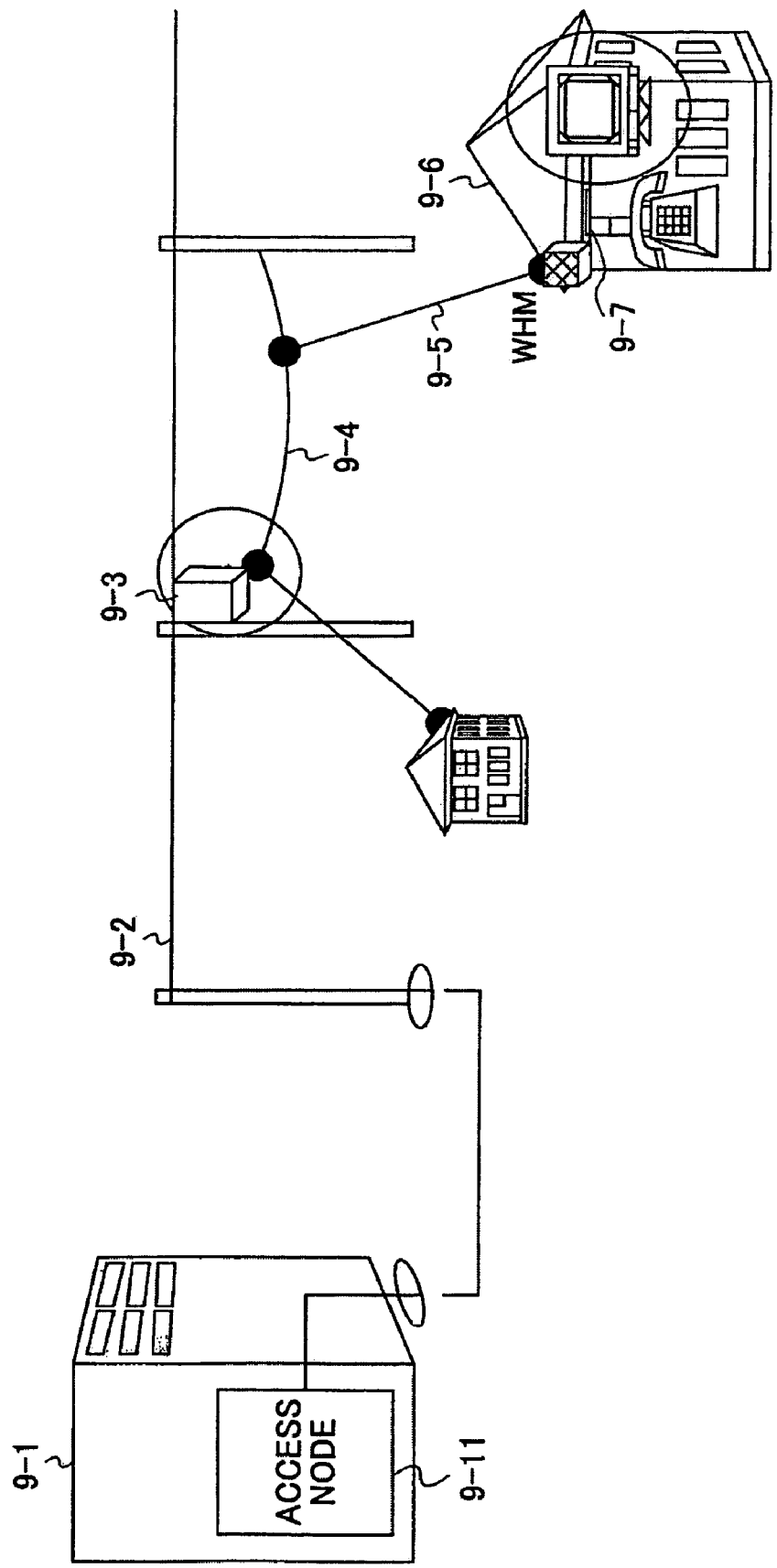
FIG. 1 is an illustration of a power line carrier communication system to which the present invention may be applied.
Figure 3A:
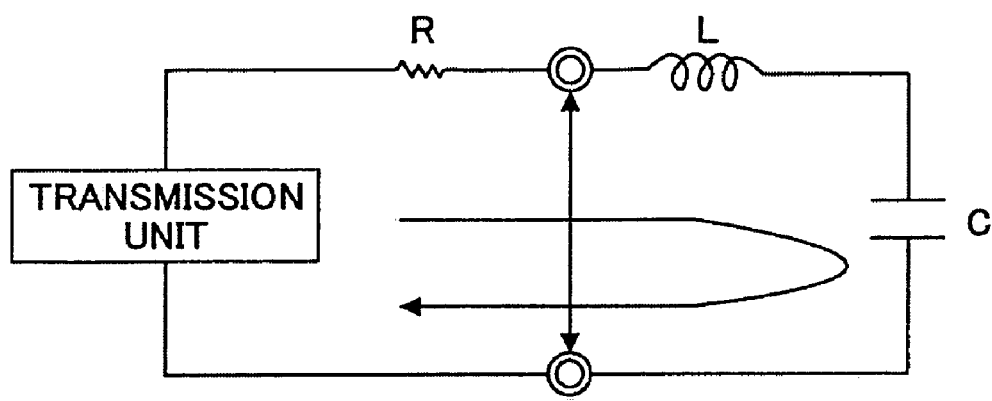
FIG. 3A shows an equivalent circuit of the power line as the transmission path from the viewpoint of a modem installed in a pole transformer of the system shown in FIG. 1.
Figure 3B:
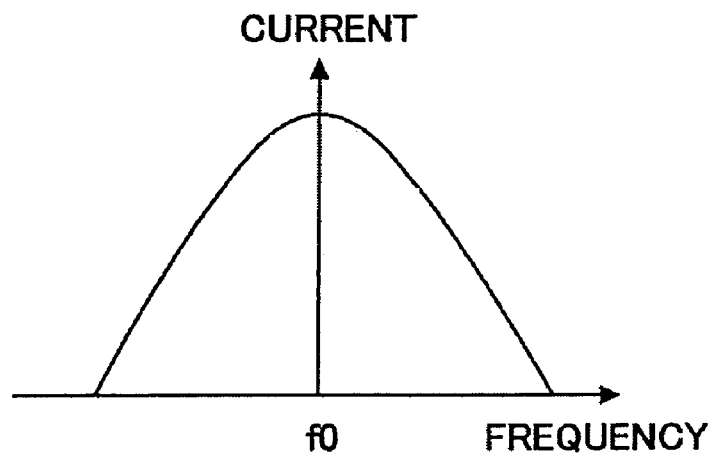
FIG. 3B shows frequency characteristics of a signal current flowing in the power line.
Figure 4A:
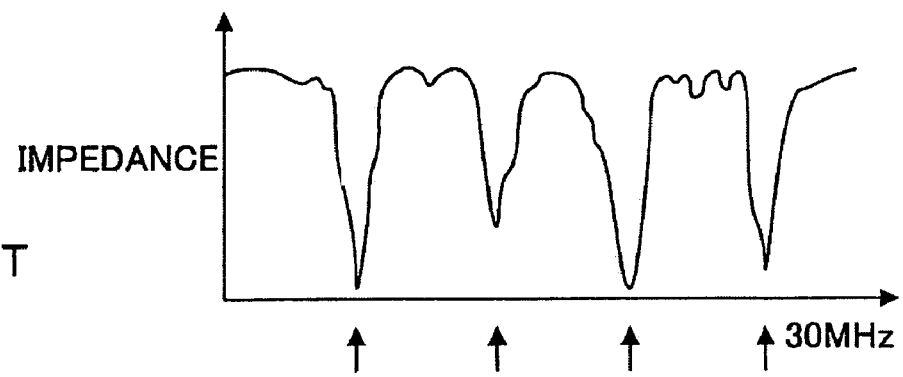
FIGS. 4A and 4B are graphs showing resonance points generated at particular frequencies by the reflected wave shown in FIG. 2.
Figure 4B:
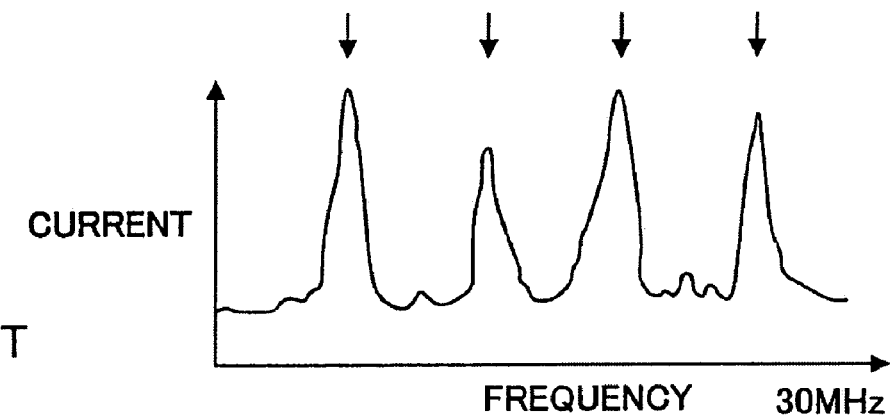
Figure 5:
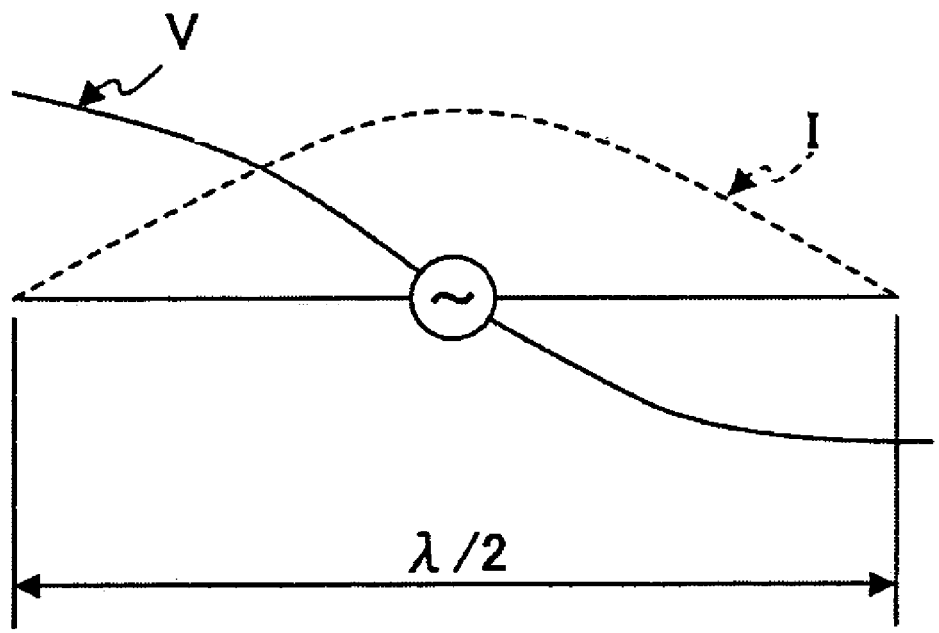
FIG. 5 shows a node of the maximum current/the maximum voltage that can be generated in the power line.

The coefficient correcting unit 6-13 calculates the respective coefficients $C_1, C_2, \ldots C_n$ so as to minimize the error signal output from the error calculating unit 6-14. In this manner, $K_1$ becomes equal to $C_1$, $K_2$ becomes equal to $C_2, \ldots$, and $K_n$ becomes equal to $C_n$ so that a transfer function of an entire transmission that includes the multi-path equalizing unit 6-1 and the communication line 6-2 becomes "1". As a result, the resonance points where the impedance becomes zero (as shown in FIG. 4A) are not generated, so that it is possible to prevent a strong leak electromagnetic field from being generated.

Figure 12:
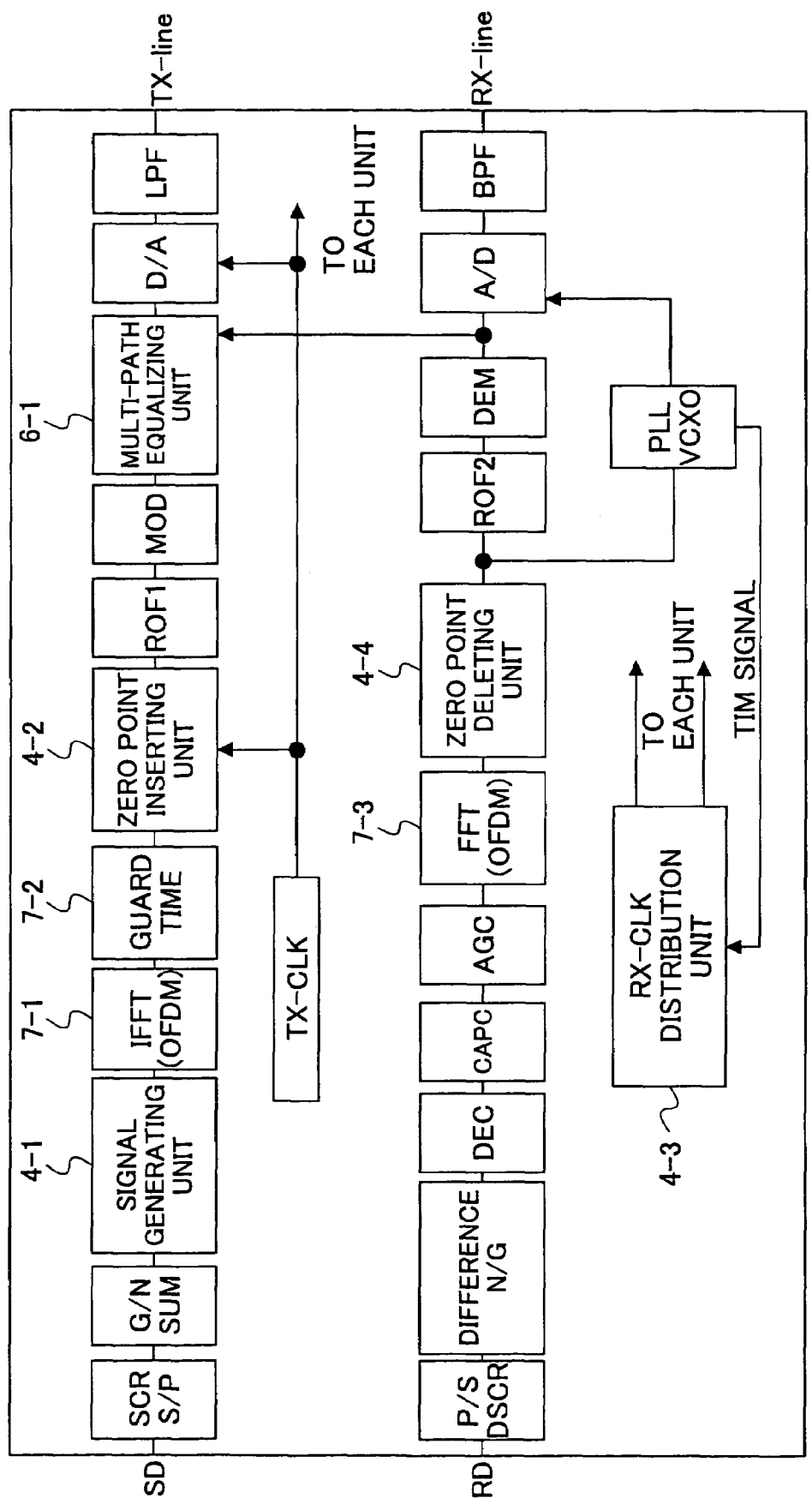
FIG. 12 shows another modem configuration related to the present invention.

FIG. 12 shows another example of the pole transformer modem disclosed in the above Japanese Patent Application. This pole transformer modem has a function of providing impulse response intervals as described with reference to FIGS. 6A through 6D and a function of negating reflected waves as described with reference to FIGS. 8A through 8F. This configuration example of FIG. 12 is made such that the multi-path equalizing unit 6-1 is added to the transmission unit of the configuration of FIG. 9, an inverse fast Fourier transform unit 7-1 for performing orthogonal frequency division multiplexing (OFDM) and a guard time adding unit 7-2 are provided to the transmission unit of FIG. 9, and a high speed Fourier transform unit 7-3 for performing multiplex dividing by orthogonal frequency division multiplexing is provided to the reception unit of FIG. 9.

As shown in FIG. 11, the multi-path equalizing unit 6-1 compares the signal from the reception line (the receiving side) with the output signal (the output side), and calculates coefficients of the FIR filter such that the transfer function of the FIR filter becomes the inverse function of the transfer function of the multi-path power line. In this manner, the multi-path equalizing unit 6-1 eliminates the disadvantage produced by the multi-paths.

Figure 13:
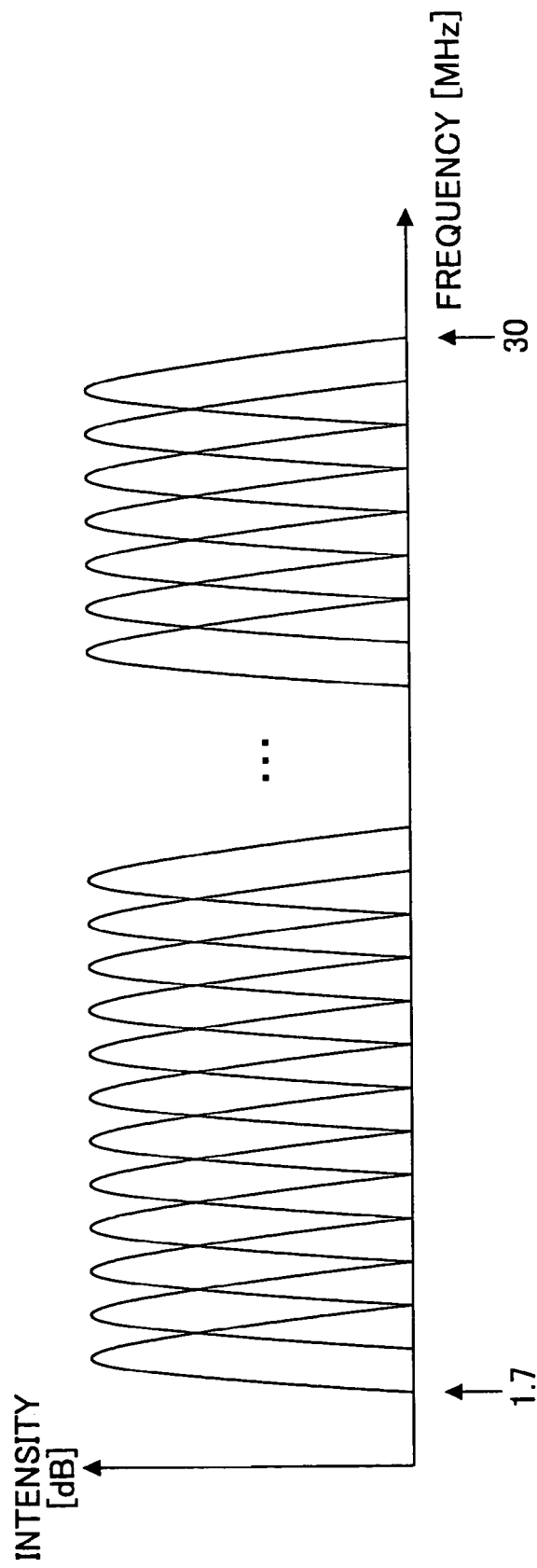
FIG. 13 is an illustration for an orthogonal frequency division multiplexing method.

On the other hand, as shown in FIG. 13, the orthogonal frequency division multiplexing (OFDM) is a communication method in which the multiplexing transmission signals that are synchronizing orthogonal multiplexing digital modulated signals having a carrier wave frequency of a minimum frequency interval are consecutively transmitted. In this orthogonal frequency division multiplexing (OFDM), the transmission signals are multi-carrier modulated signals, so that a symbol period can be made to be longer compared with the case of transmitting a single carrier wave. Furthermore, a guard time adding unit 7-2 adds a guard interval on the time axis to reduce intersymbol interference even when there are the multi-paths as shown in FIG. 2. Accordingly, it is possible to reduce degrading in the transmission characteristics, and to suppress the transmission from being affected by a ghost.

In this guard interval addition, without changing a subchannel frequency interval, the symbol period is made to be longer by the guard interval that is determined based on an assumed delay time of the multi-path wave. In the reception unit, symbol data of the guard interval part that is assumed to be affected by the intersymbol interference is not used, and the remaining symbol data is used to demodulate orthogonal frequency division multiplexing (OFDM) data, so that the influence by the noises can be removed.

According to the present invention, there is provided a data transmission method in which a leak electromagnetic field in the power line carrier system can be more effectively suppressed.

Figure 14:
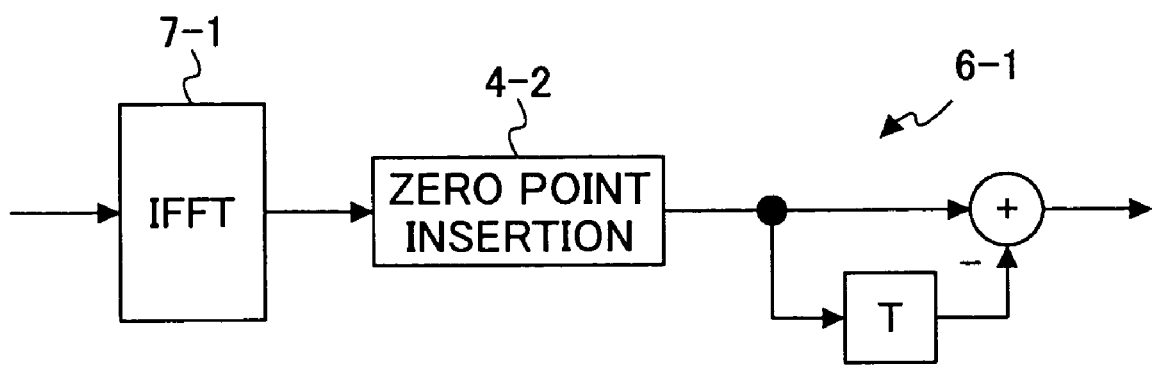
FIG. 14 is an illustration for a problem in the modem configuration of FIG. 12.

FIG. 14 is a block diagram showing a part of the transmission unit of the above Japanese Patent Application shown in FIG. 12. In other words, a circuit configuration of FIG. 14 includes the inverse fast Fourier transform unit 7-1 that performs the orthogonal frequency division multiplexing (OFDM), and the inverse fast Fourier transform unit 7-1 performs signal transform from a frequency axis to a time axis on the signal including signal points generated by a signal point generating unit 4-1. Thereafter, a zero point inserting unit 4-2 inserts a zero point into the signal produced by the inverse fast Fourier transform unit 7-1, as shown in FIG. 7. Accordingly, as shown in FIGS. 6A through 6D, time intervals are provided between the impulses of the transmission signals, so that it is possible to prevent mutual interference between the consecutively transmitted impulses. Furthermore, by taking various multi-paths into account, the finite-difference function unit 6-1 as the multi-path equalizing unit 6-1 adds each signal having the opposite phase of the each reflected wave such that the added signal and the reflected wave negate each other. As a result, as described with reference to FIGS. 8A through 8D, the reflected signals generated by the multi-paths can be effectively negated, so that it is possible to effectively suppress a leak electromagnetic field from being generated. For simplicity, one of the multi-paths in the finite-difference function unit 6-1 is shown in FIG. 14.

Problems in this configuration will be described in the following.

The number of the zero points inserted by the zero point inserting unit 4-2 is determined by an environment to which the data transmission device is applied, types of the power lines for the power line carrier, the length of the power line, and the like. However, the number of points that is the number of carriers (carrier waves) in the inverse fast Fourier transform unit needs to be changed depending on the number of the inserted zero points. In other words, for example, when no zero point is inserted between two signal points, the inverse fast Fourier transform is performed with a process of 128 points (this is assumed to be a standard condition). When one zero point is inserted between respective two signal points, the signal transmission speed becomes the half of the signal transmission speed in the standard condition, so that the inverse fast Fourier transform needs to be performed by a process of 64 points that is half of the number in the standard condition. Similarly, when three zero points are inserted between respective two signal points, the inverse fast Fourier transform needs to be performed by a process of 32 points that is the one fourth of the number in the standard condition. When seven zero points are inserted between the respective two signal points, the inverse fast Fourier transform needs to be performed by a process of 16 points that is one eighth of the number in the standard condition. Thus, when zero points are inserted between the signal points, it is necessary to provide a configuration that copes with the inverse Fourier transform of many different types of the point number. As a result, a circuit required for the inverse Fourier transform unit 7-1 becomes large in a size.

Figure 15A:
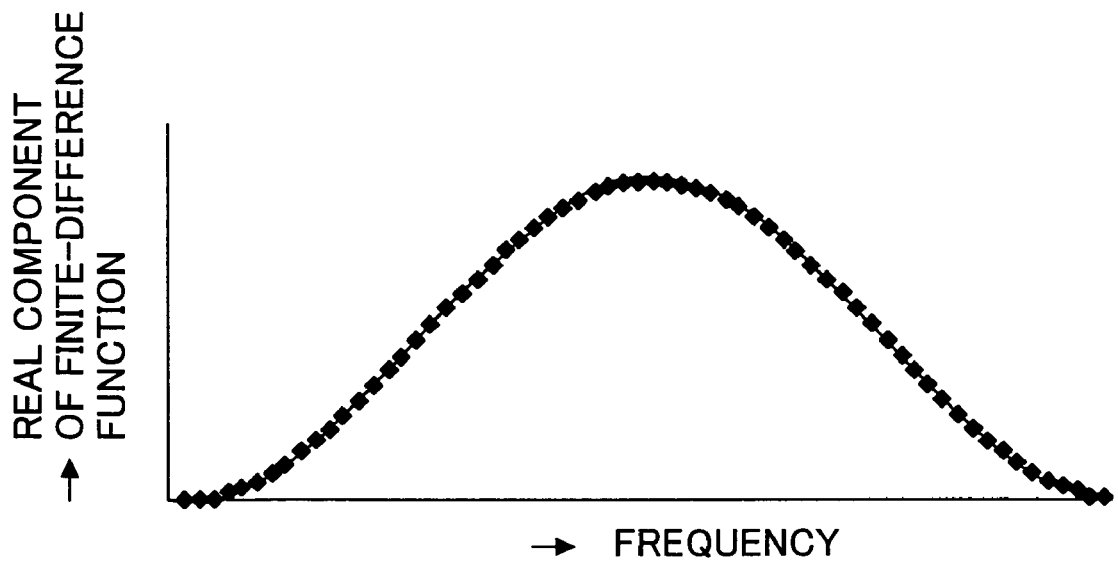
FIGS. 15A and 15B show one example of frequency characteristics of the finite-difference function unit according to the first embodiment of the present invention.
Figure 15B:
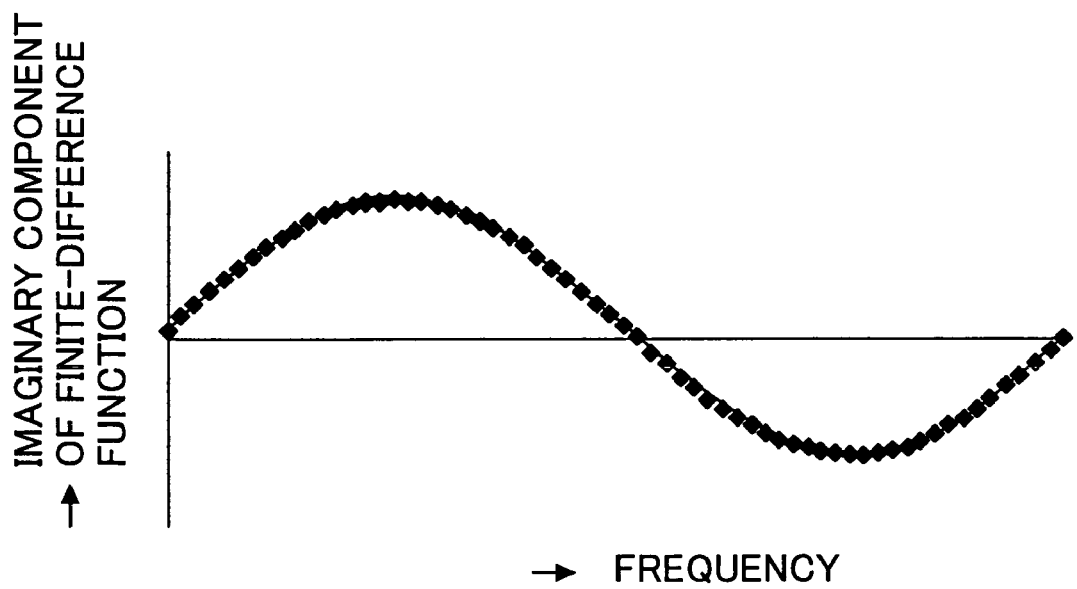

The finite-difference function unit 6-1 generally has finite-difference function characteristics in FIGS. 15A and 15B that show a real component and a imaginary component. Accordingly, a signal amplitude is low in a low frequency range. A signal-to-noise ratio S/N is deteriorated in this region. The reason of this is as follows. The characteristics of the finite-difference function unit 6-1 of FIG. 14 are expressed by a first equation:

$$y = x - x*Z^{-1} = x(1 - Z^{-1}).$$

In the first equation, "x" designates an amplitude of the input signal of the finite-difference function unit 6-1, and "y" designates an amplitude of the output signal of the finite-difference function unit. Furthermore, a second equation where "ω" designates an angular frequency, and when "T" is a delay time of a delay tap T, "Z" becomes "$e^{j\omega T}$" is obtained from the first equation. That is, the second equation is:

$$y/x = 1 - Z^{-1} = 1 - e^{-j\omega T}$$
$$= 1 - (\cos\omega T - j\sin\omega T)$$
$$= (1 - \cos\omega T) + j\sin\omega T.$$

Accordingly, the finite-difference function unit 6-1 shown in FIG. 14 has the characteristics as shown in FIGS. 15A and 15B.

Figure 16:
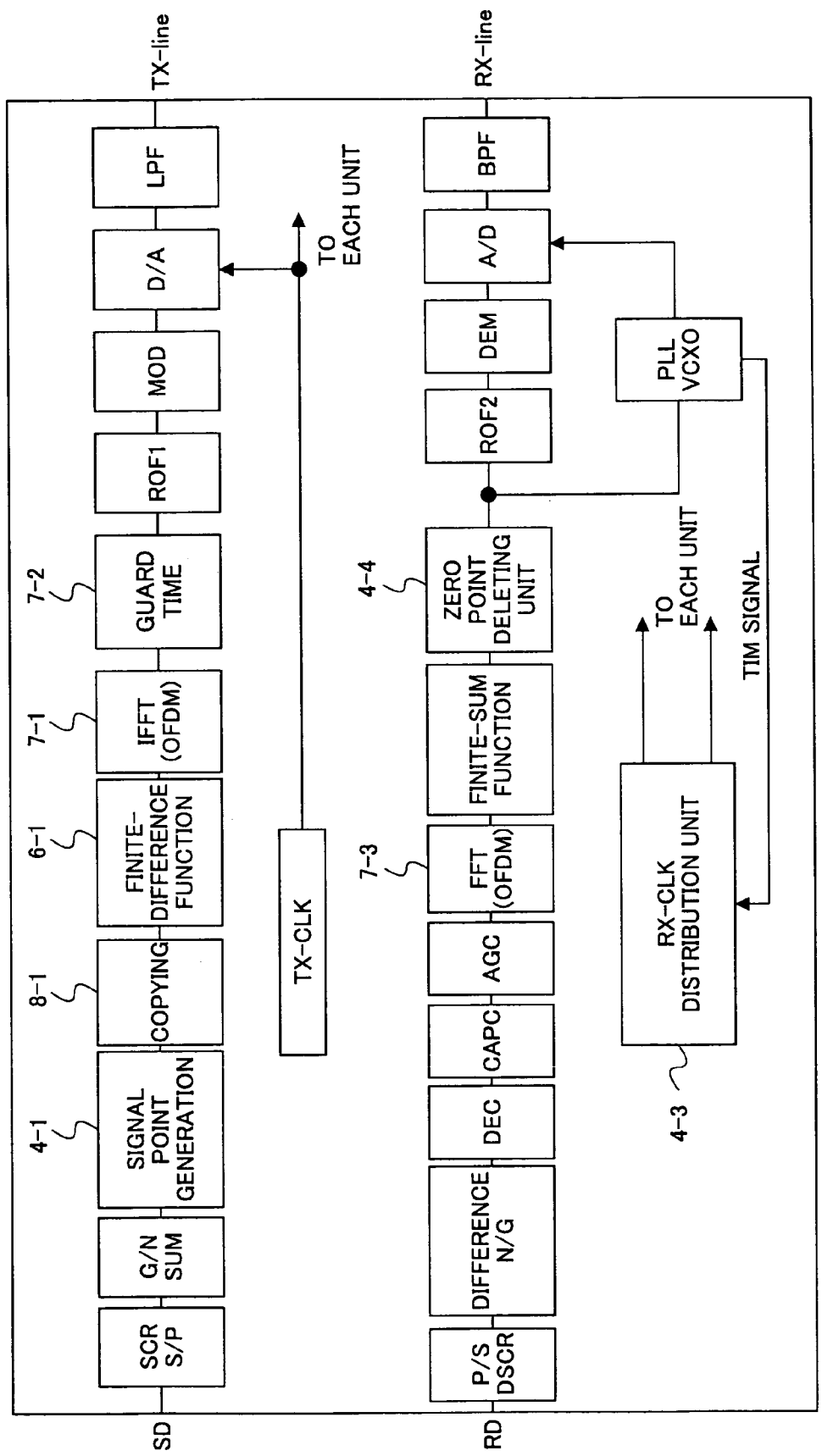
FIG. 16 shows an example of the configuration of a modem as a data transmission device according to the first embodiment of the present invention.

FIG. 16 shows a configuration of a modem functioning as a data transmission device according to a first embodiment of the present invention. The circuit configuration in the first embodiment is basically the same as that shown in FIG. 12, but in the first embodiment, a copying unit 8-1 is provided instead of the zero point inserting unit 4-2 of the circuit configuration in FIG. 12. Furthermore, in the first embodiment, the inverse fast Fourier transform unit 7-1 and the guard time inserting unit 7-2 are provided in the downstream side of the copying unit 8-1 and the finite-difference function unit (multi-path equalizing unit) 6-1.

In the modem of FIG. 16, in the frequency region, the copying unit 8-1 copies signal points that are generated by the signal point generating unit 4-1. The inverse fast Fourier transform unit 7-1 performs the inverse Fourier transform on the thus-obtained signal in the frequency region. In this manner, as described later, the same advantage as that achieved by the zero point inserting is obtained on the time axis. Further, in the modem of the first embodiment, the finite-difference function unit 6-1 is provided between the copying unit 8-1 and the inverse fast Fourier transform unit 7-1 so as to perform a vector multiplication process by the finite-difference function. In this manner, as described later, it is possible to generate a signal in terms of the time axis (e.g., the signal as shown in FIG. 8E) that has the same amplitude as that of the previous signal and has a polarity opposite to the polarity of the previous signal.

Accordingly, as described with reference to FIG. 8E, it is possible to negate the reflected wave that is caused by the multi-path phenomenon.

The zero point inserting advantage that is obtained by signal point copying will be described with reference to FIGS. 17A through 17H. The zero point inserting advantage is achieved by the copying unit 8-1 in the circuit configuration of FIG. 16. As shown in FIG. 17A, when zero point data on the frequency axis is input in parallel with the data that is constituted by a set of signal points as shown in FIG. 17B, the frequency band becomes twice as long as the original frequency band. As a result, as shown in FIG. 17C, the signal on the time axis is obtained. On the other hand, when the copied data is input to the inverse fast Fourier transform function unit 7-1 as shown in FIG. 17D such that the copied data on the frequency axis is input in parallel with the data that is constituted by a set of signal points as shown in FIG. 17E, it is possible to obtain the state on the time axis where one zero point is inserted between two signal points, as shown in FIG. 17F. Similarly, when three copied data is input to the inverse fast Fourier transform unit 7-1 such that the three copied data on the frequency axis is input in parallel with the data that is constituted by a set of signal points, it is possible to obtain the state on the time axis where three zero points are inserted between two signal points as shown in FIG. 17H.

In other words, when the data constituted by 64 points is copied once, and the data corresponding to a total of 128 points on the frequency axis is input to the inverse fast Fourier transform unit 7-1, the signal in which one zero point is inserted between two signal points on the time axis is formed. Similarly, when data constituted by 32 points is copied three times, and the data corresponding to a total of 128 points on the frequency axis is input to the inverse fast Fourier transform unit 7-1, the signal in which three zero points are inserted between two signal points on the time axis is formed. In these cases, the inverse fast Fourier transform unit may be configured so as to always perform the process corresponding to 128 points. Accordingly, it is possible to simplify the configuration of the inverse fast Fourier transform unit 7-1.

Figure 18:
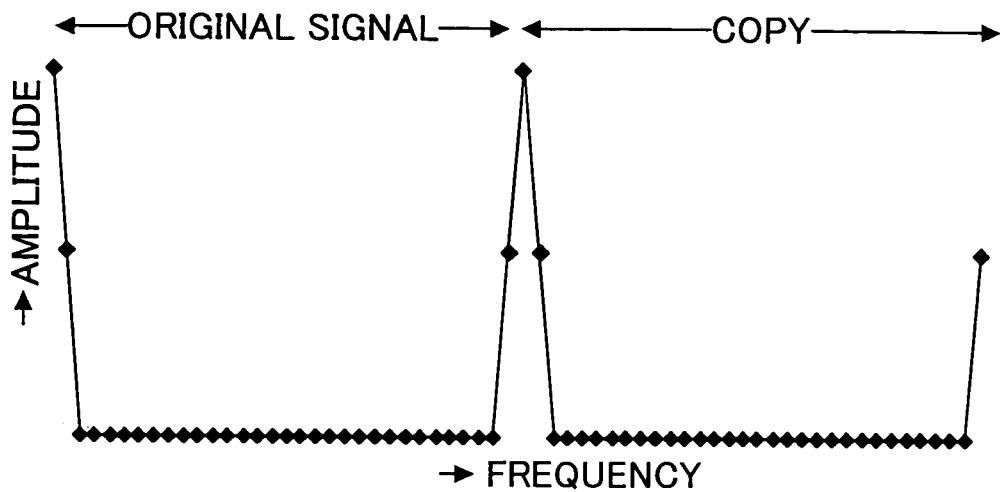
FIG. 18 shows an example of an output signal from the copying unit of FIG. 16.

FIG. 18 shows the state where signal points generated by the signal point generating unit 4-1 of FIG. 16 are copied by the copying unit 8-1. In this example, for simplicity, the inverse fast Fourier transform for 64 points is shown in FIG. 16. One half of the frequency band in the inverse fast Fourier transform unit 7-1 is assigned to the original signal, and the other half of the frequency band in the inverse fast Fourier transform unit 7-1 is assigned to the copied signal. Further, in this case, as one example, it is assumed that the frequency characteristics of the inverse fast Fourier transform are cosine square characteristics in terms of the inclination. Accordingly, it is possible to obtain the cosine square impulse response having a wide response width, and to obtain the output signal in which one zero point is inserted between two signal points.

Figure 19:
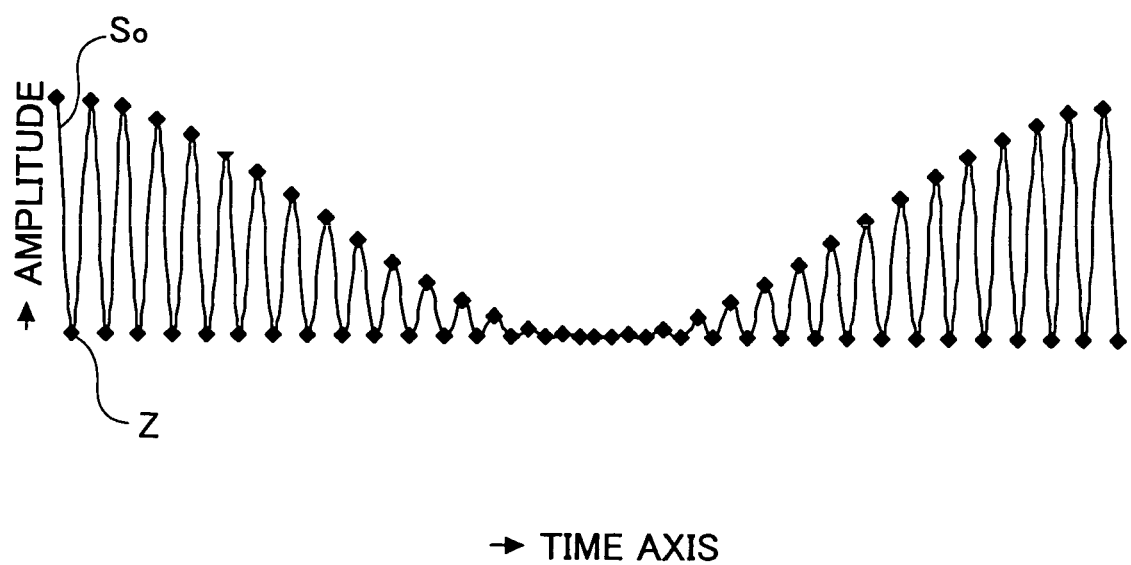
FIG. 19 shows an example of a signal shape produced by an inverse fast Fourier transform unit when the signal of FIG. 18 is not processed by the finite-difference function unit of FIG. 16.

As shown in FIG. 16, the finite-difference function unit 6-1 is provided between the copying unit 8-1 and the inverse fast Fourier transform unit 7-1. The finite-difference function unit 6-1 has characteristics as shown in FIGS. 15A and 15B. Accordingly, when the signal on the frequency axis as shown in FIG. 18 is input to the finite-difference unit 6-1 from the copying unit 8-1, the vector multiplication is performed on this input signal by the finite-difference function shown in FIGS. 15A and 15B. Next, the function of the finite-difference function unit 6-1 will be described. It is assumed that the finite-difference function unit 6-1 is not provided, and the output from the copying unit 8-1 is input directly to the inverse fast Fourier transform unit 7-1. On this assumption, the inverse fast Fourier transform unit 7-1 performs the inverse fast Fourier transform on the input signal thereof so as to produce the transformed signal shape on the time axis shown in FIG. 19. As shown in FIG. 19, since zero points are inserted, the original signal So and the zero point Z alternately appear in the signal on the time axis.

Figure 20:
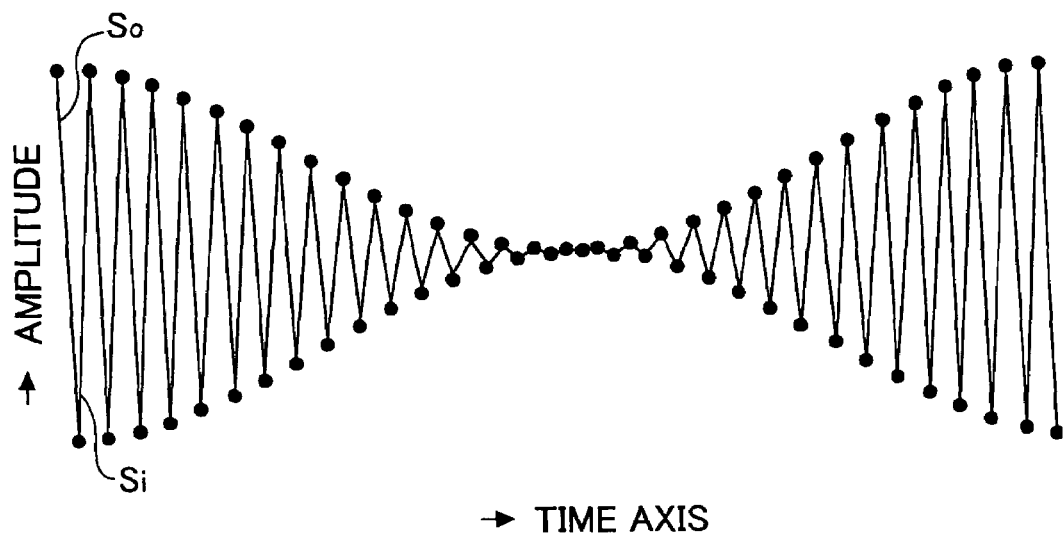
FIG. 20 shows one example of a signal shape produced by the inverse fast Fourier transform unit when the signal of FIG. 18 is processed by the finite-difference function unit.

Meanwhile, according to the first embodiment, the output from the copying unit 8-1 is input to the finite-difference function unit 6-1 where the finite-difference function process is performed. Thereafter, the output from the finite-difference function unit 6-1 is input to the inverse fast Fourier transform unit 7-1 where the inverse fast Fourier transform is performed to transform the input signal into the signal on the time axis shown in FIG. 20. As shown in FIG. 20, the signal produced by the inverse fast Fourier transform unit 7-1 includes the inverted signal data Si. That is, the zero points Z are inserted by the copying unit 8-1, and are transformed into the inverted signal data Si. In other words, the original signal So and the inverted signal Si are alternately output as the cosine square impulse response. In the above example, the number of times of the copying is one, but the number of times of the copying by the copying unit 8-1 may be increased so that one or more zero points Z are inserted between the original signal and the inverted signal to appropriately adjust the leak electromagnetic field suppressing effect. This case will be described in the following.

Figure 21:
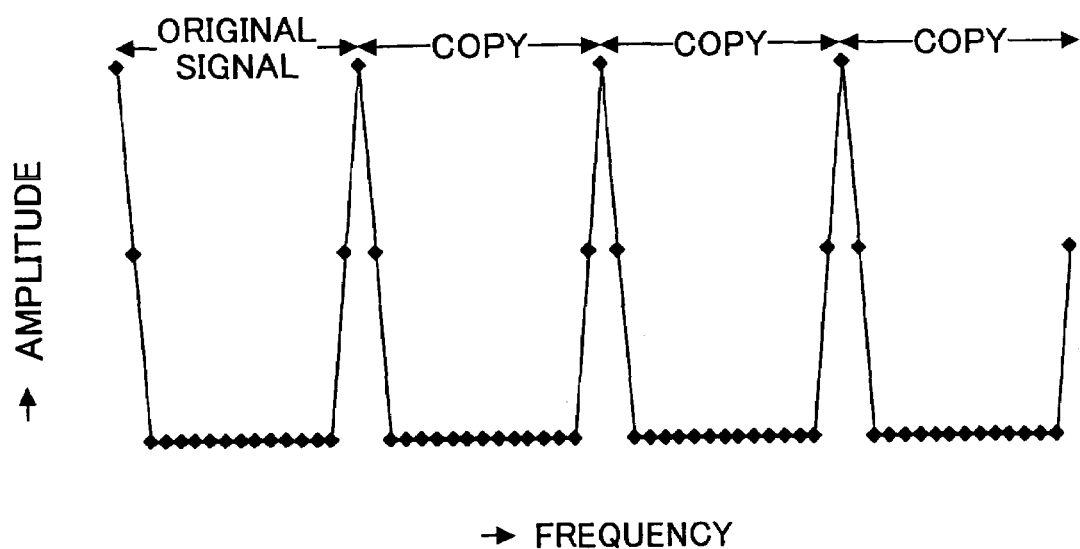
FIG. 21 shows another example of an output signal from the copying unit of FIG. 16.
Figure 22:
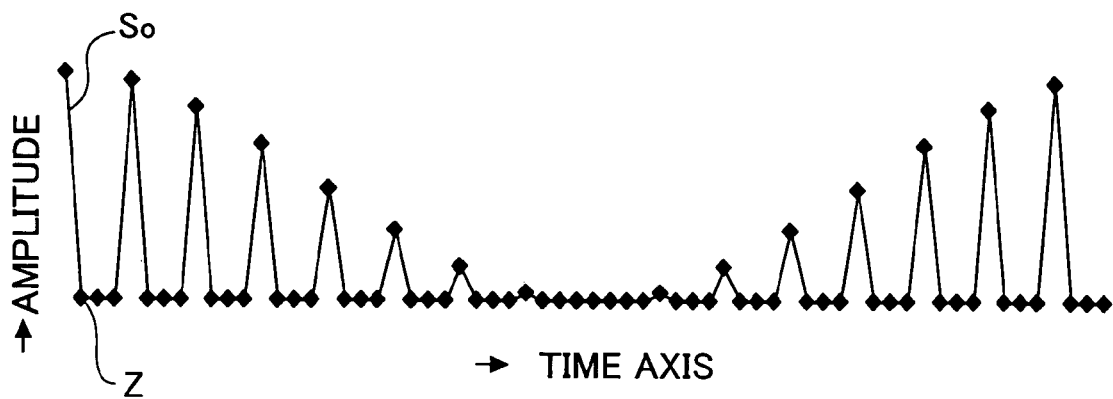
FIG. 22 shows an example of a signal shape produced by the inverse fast Fourier transform unit when the signal of FIG. 21 is not processed by the finite-difference function unit.
Figure 23:
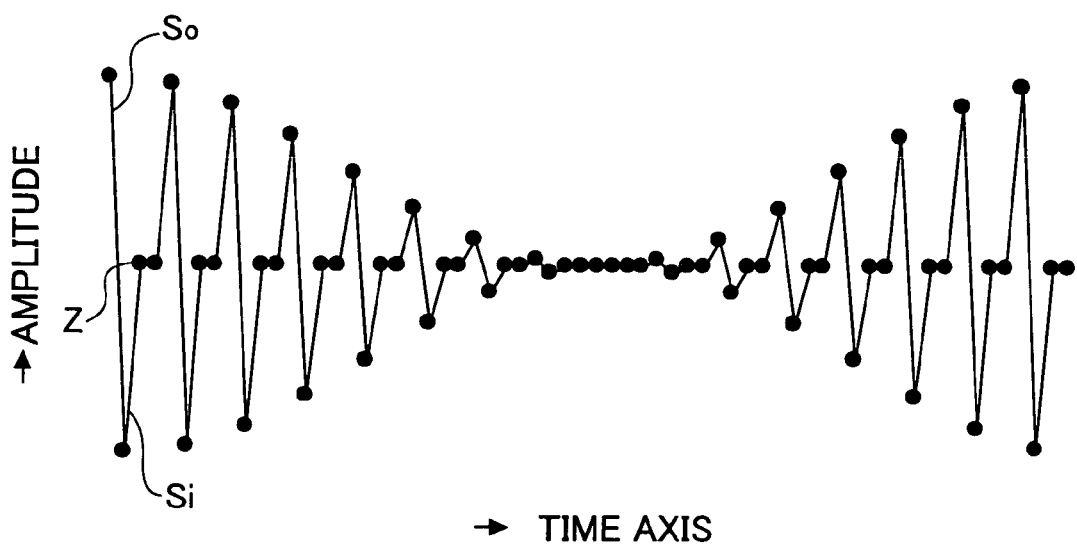
FIG. 23 shows an example of a signal shape produced by the inverse fast Fourier transform unit when the signal of FIG. 21 is processed by the finite-difference function unit.

FIG. 21 shows an example in the inverse fast Fourier transform by 64 points. One fourth of the frequency band of the inverse fast Fourier transform unit 7-1 is assigned to the original signal, and each of the remaining three fourths of this frequency band is assigned to one copied signal. As a result of this, two zero points Z are inserted between two signal points as shown in FIG. 23. On the other hand, FIG. 22 shows the signal obtained by the inverse fast Fourier transform when the finite-difference function process is not performed by the finite-difference function unit 6-1. In other words, the process by the finite-difference function unit 6-1 causes one of the three zero points Z inserted between two signal points to become the inverted signal Si. As a result, as shown in FIG. 23, when the original signal and the inverted signal of the original signal are alternately output as the cosine square impulse response, two zero points Z are inserted between the original signal So and the inverted signal Si.

Figure 24:
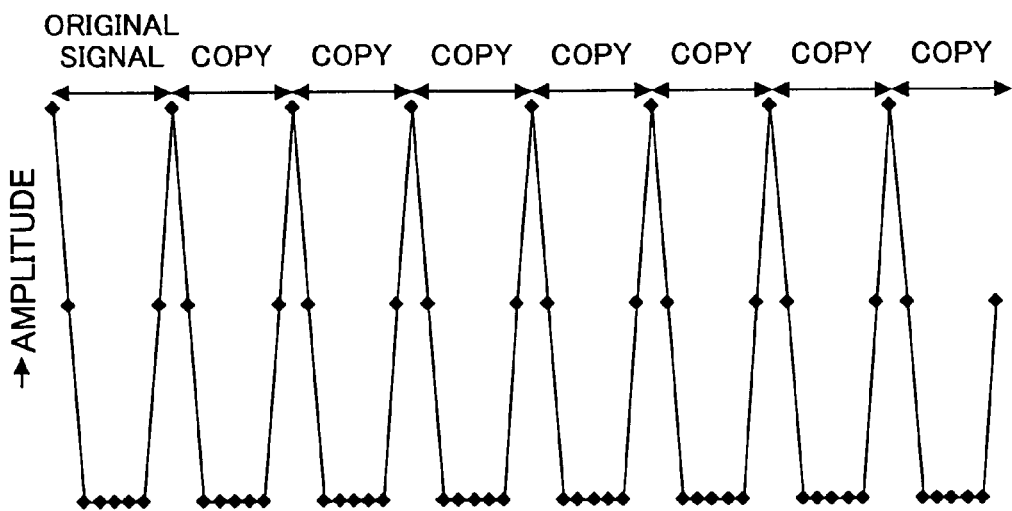
FIG. 24 shows another example of an output signal from the copying unit of FIG. 16.
Figure 25:
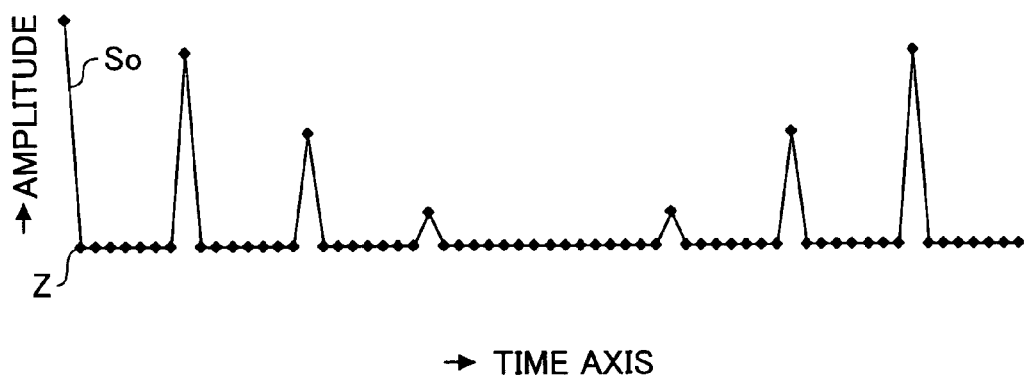
FIG. 25 shows an example of a signal shape produced by the inverse fast Fourier transform unit when the signal of FIG. 24 is not processed by the finite-difference function unit of FIG. 16.
Figure 26:
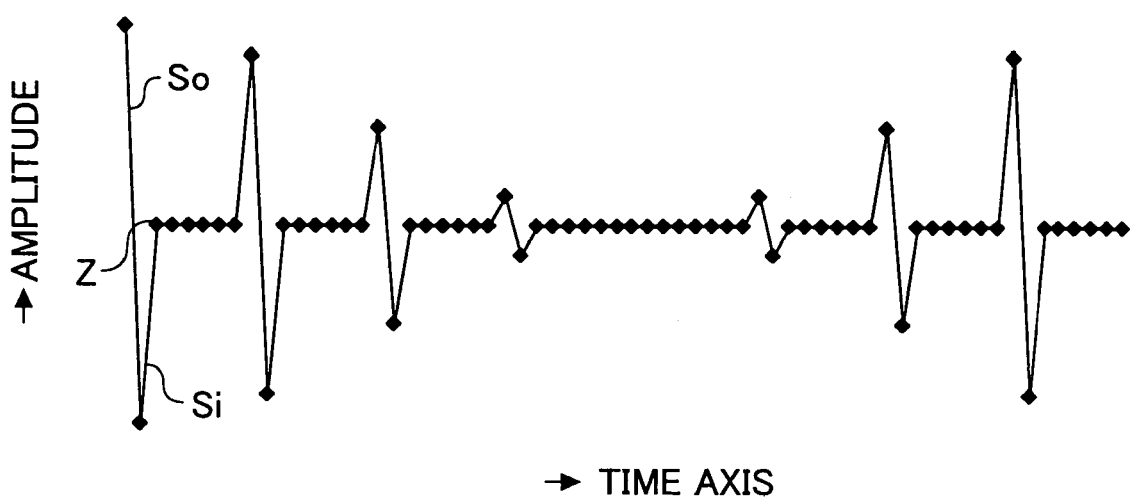
FIG. 26 shows an example of a signal shape produced by the inverse fast Fourier transform unit when the signal of FIG. 24 is processed by the finite-difference function unit of FIG. 16.

FIG. 24 shows an example in the inverse fast Fourier transform by 64 points. In this example, one eighth of the frequency band of the inverse fast Fourier transform unit 7-1 is assigned to the original signal, and each of the seven other eighths of the frequency band is assigned to one copied signal. As a result of this, as shown in FIG. 26, in the output signal from the inverse fast Fourier transform unit 7-1, six zero points Z are inserted between two signal points. Meanwhile, FIG. 25 shows a wave shape obtained by the inverse fast Fourier transform when the finite-difference function process is not performed by the finite-difference function unit 6-1. In other words, the process by the finite-difference function unit 6-1 causes one of the seven zero points Z inserted by the copying process to become the inverted signal Si. Accordingly, as shown in FIG. 26, when the original signal So and the inverted signal Si of the original signal are alternately output as the cosine square impulse response, six zero points Z are inserted between the original signal So and the inverted signal Si.

Figure 27A:
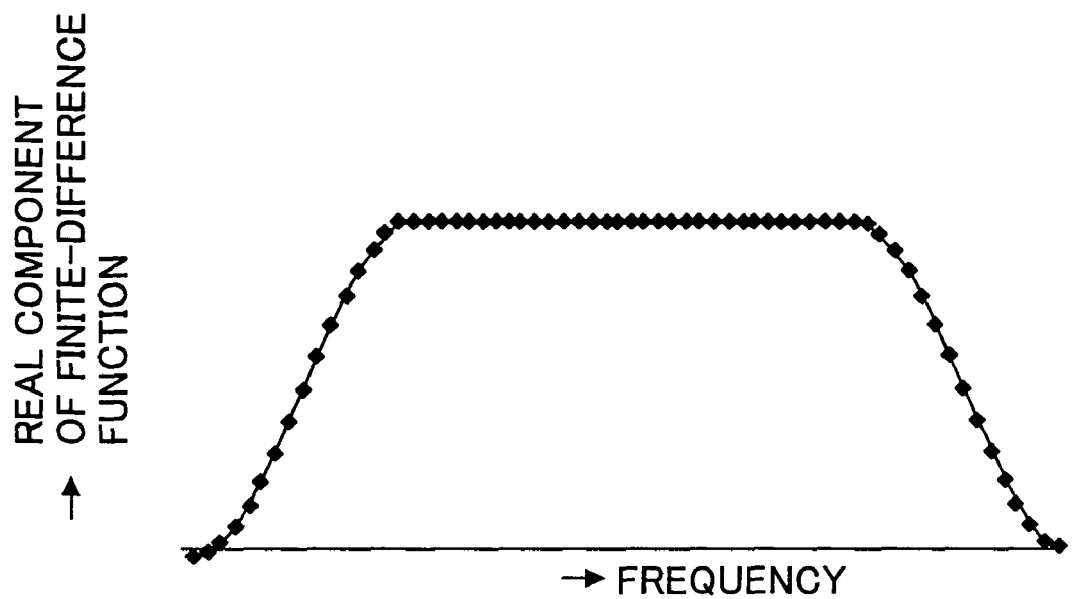
FIGS. 27A and 27B show frequency characteristics of the finite-difference function unit of FIG. 16.
Figure 27B:
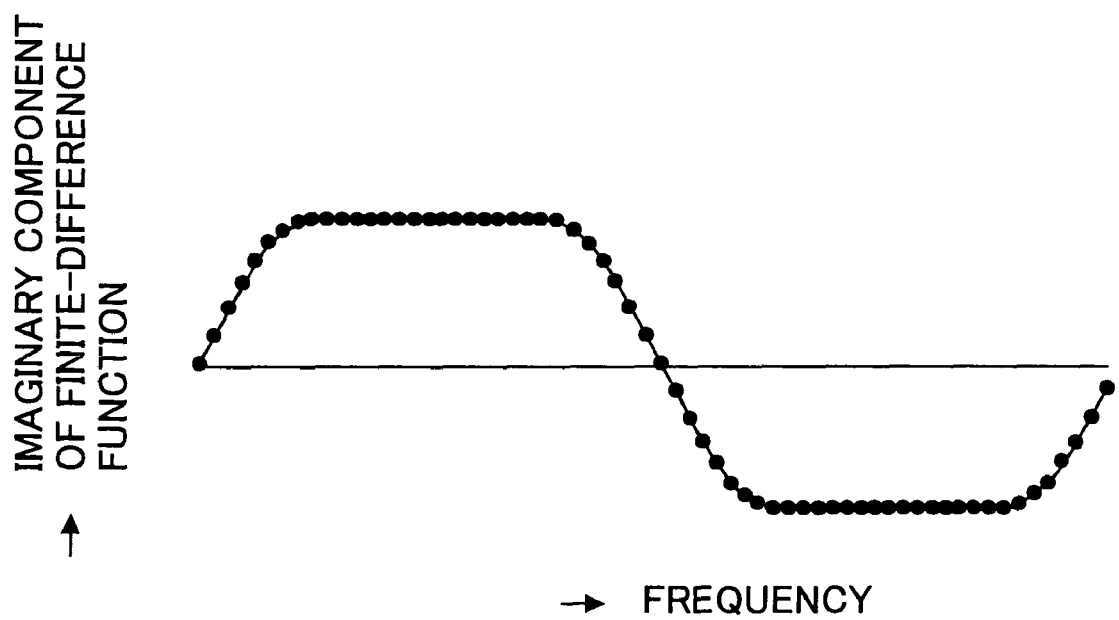

Next, a second embodiment of the present invention will be described. In the second embodiment, the 100 percent cosine square characteristics (shown in FIGS. 15A and 15B) in the inclination of the finite-difference function of the finite-difference function unit 6-1 are changed, the characteristics of the finite-difference function unit 6-1 have a flat region as shown in FIGS. 27A and 27B, and this flat region may be further widened. In this manner, it is possible to suppress degrading in a signal-to-noise ratio S/N at the low frequency side. The finite-difference function characteristics shown in FIGS. 27A and 27B can be realized by decreasing a roll-off rate of the cosine square characteristics in the finite-difference function unit 6-1.

Figure 28A:
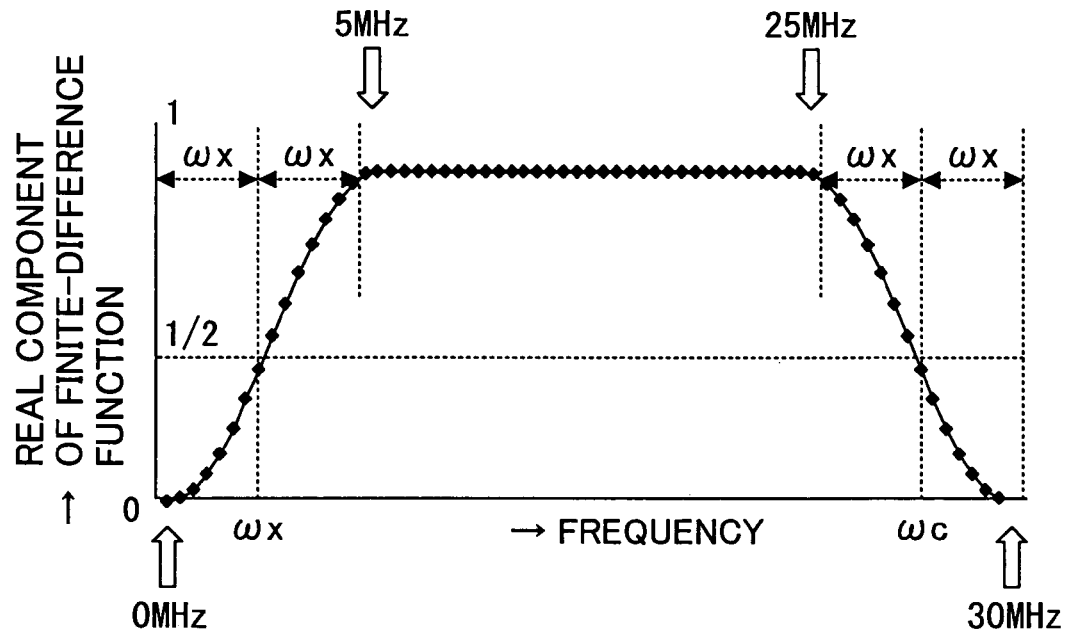
FIGS. 28A and 28B show one example of the equation frequency characteristics corresponding to the characteristics of FIGS. 27A and 27B.
Figure 28B:
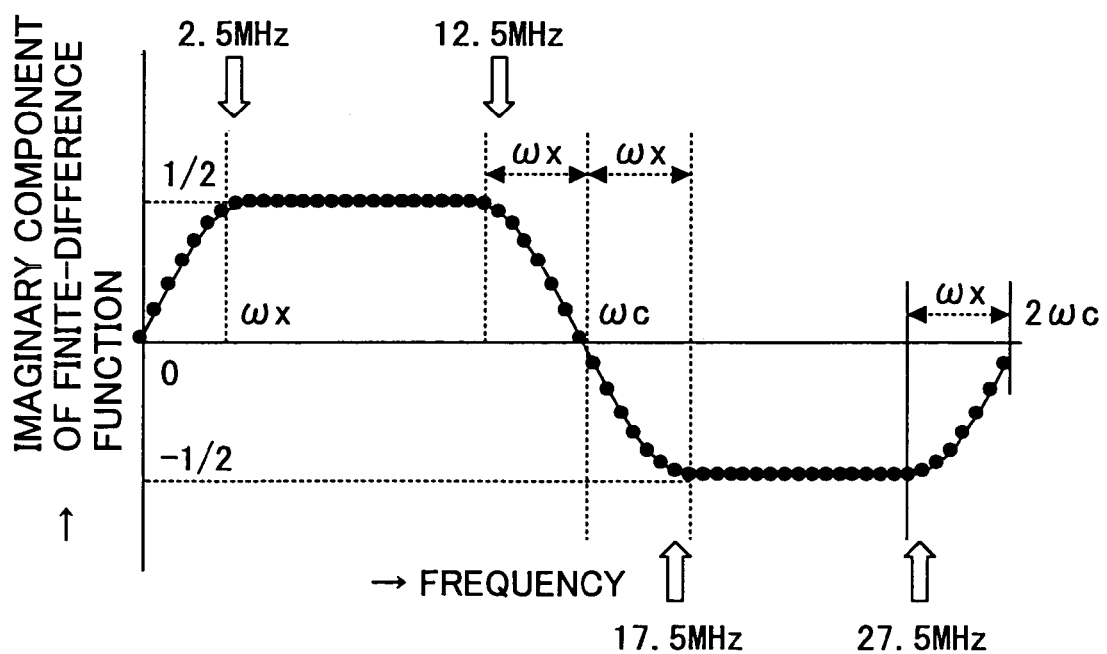

The equation showing the frequency characteristics shown in FIGS. 27A and 27B of the finite-difference function unit 6-1 will be described with reference to FIGS. 28A and 28B. In the example of FIGS. 27A and 27B, the band width is 25 MHz, and the roll-off rate is 20%. In this example, the real component $Hr(\omega)$ of the frequency characteristics of the finite-difference function unit 6-1 is expressed by the third equation:

$$Hr(\omega) = \cos^2[\omega/(4\omega x)]\pi \quad \text{(when } 0 \leq \omega \leq 2\omega x\text{)}$$
$$= 1 \quad \text{(when } 2\omega x \leq \omega \leq \omega c - \omega x\text{)}$$
$$= \cos^2[\{\omega - (\omega c - \omega x)\}/(4\omega x)]\pi$$
$$\text{(when } \omega c - \omega x \leq \omega \leq \omega c + \omega x\text{).}$$

On the other hand, the imaginary component $Hi(\omega)$ is expressed by the fourth equation:

$$Hi(\omega) = \cos^2[\omega/(4\omega x) + 1/4]\pi \quad \text{(when } 0 \leq \omega \leq \omega x\text{)}$$
$$= 1/2 \quad \text{(when } \omega x \leq \omega \leq \omega c - \omega x\text{)}$$
$$= \cos^2[\{\omega - (\omega c - \omega x)\}/(4\omega x)]\pi$$
$$\text{(when } \omega c - \omega x \leq \omega \leq \omega c + \omega x\text{)}$$
$$= -1/2 \quad \text{(when } \omega c + \omega x \leq \omega \leq 2\omega c - \omega x\text{)}$$
$$= \cos^2[\{\omega - (2\omega c - \omega x)\}/(4\omega x) + 1/4]\pi - 1/2$$
$$\text{(when } 2\omega c - \omega x \leq \omega \leq 2\omega c\text{).}$$

According to the embodiments of the present invention, it is possible to perform the inverse fast Fourier transform with the same point number either in the case where one or more zero points are inserted between two signal points of the original signal without outputting the inverted signal as shown in FIGS. 7, 19, 22, 25, and so on, or in the case where the signal inverted from the original signal by 180 degrees is output after the original signal as shown in FIGS. 20, 23, 26, and so on. Accordingly, it is possible to simplify the configuration of the inverse fast Fourier transform unit 7-1.

In the configuration in which the prevention of the intersymbol interference, and the negating of the reflected wave can be carried out by outputting the signal inverted by 180 degrees from the original signal on the time axis after the original signal, it is possible to arbitrarily adjust the number of the zero points inserted between two original signal points or between the original signal point and the inverted signal point without changing the number of the points processed in the inverse fast Fourier transform process, as shown in FIGS. 19 through 26. Accordingly, it is possible to further and effectively improve the leak electromagnetic field suppressing advantage by inserting one or more zero points between one original signal point and the next signal point or between one original signal point and the 180-degree inverted signal point.

As described with reference to FIGS. 19 through 25, the vector multiplication is performed on the signal points as the inverse fast Fourier transform input. In this manner, it is possible to easily obtain the signal that is inverted by 180 degrees from the original signal.

Furthermore, as described with reference to FIGS. 27A through 28B, the roll-off rate of the cosine square characteristics may be decreased so as to minimize the signal attenuation in the used band. Thereby, it is possible to improve the signal-to-noise ratio S/N.

This patent application is based on Japanese priority patent application No. 2002-246840 filed on Aug. 27, 2002, the entire contents of which are hereby incorporated by reference.

What is claimed is:

1. A method of transmitting data, comprising the steps of:
    (a) performing predetermined processing on transmission data on a frequency axis such that a zero signal and/or an inverted signal is inserted between transmission signals of the transmission data on a time axis; and
    (b) transforming the transmission data processed in the step (a) into a time-axis signal,
    wherein the step (a) comprises the step (c) of performing the predetermined processing on the transmission data on the frequency axis such that the inverted signal and at least one zero signal point are inserted between the transmission signals on the time axis.

2. A method of transmitting data, comprising the steps of:
    (a) performing predetermined processing on transmission data on a frequency axis such that a zero signal and/or an inverted signal is inserted between transmission signals of the transmission data on a time axis; and
    (b) transforming the transmission data processed in the step (a) into a time-axis signal,
    wherein the step (a) comprises the step (d) of copying the transmission data on the frequency axis, and
    the step (b) comprises the step (e) of processing the transmission data and the copied transmission data in parallel.

3. The method according to claim 2, wherein the, step (b) comprises the step (h) of transforming the transmission data processed in the step (a) into the time-axis signal by using inverse fast Fourier transform processing,
    and the step (d) comprises the step (i) of determining a first number of points that are assigned to the transmission data such that data of both the transmission data and the copied transmission data correspond to a second number of points that is a number of carriers used in the inverse fast Fourier transform processing.

4. The method according to claim 2, wherein the step (d) comprises the step (j) of adjusting a number of times of copying the transmission data, the number of times of copying being a number of times of generating transmission data by copying the transmission data.

5. The method according to claim 2, wherein the step (d) comprises the step (k) of assigning frequency bands each having a substantially same width to the transmission data and the copied transmission data, respectively.

6. A method of transmitting data, comprising the steps of:
    (a) performing predetermined processing on transmission data on a frequency axis such that a zero sianal and/or an inverted signal is inserted between transmission signals of the transmission data on a time axis; and
    (b) transforming the transmission data processed in the step (a) into a time-axis signal,
    wherein the step (a) comprises the step (f) of performing the predetermined processing on the transmission data such that the transmission signal of the transmission data is delayed by a predetermined time, and the delayed transmission signal is subtracted from the transmission signal.

7. The method according to claim 6, further comprising the step (g) of decreasing a roll-off rate of frequency characteristics in the processing of the step (f).

8. The method according to claim 7, wherein in the frequency characteristics, a band width is about 25 MHz, and the decreased roll-off rate is about 20%.

9. A data transmission device, comprising:
    frequency-axis processing means for performing predetermined processing on transmission data on a frequency axis such that a zero signal and/or an inverted signal is inserted between transmission signals of the transmission data on a time axis; and
    time-axis transform means for transforming the transmission data processed by the frequency-axis processing means into a time-axis signal,
    wherein the frequency-axis processing means perform the predetermined processing on the transmission data on the frequency axis such that the inverted signal and at least one zero signal point are inserted between the transmission signals of the transmission data on the time axis.

10. A data transmission device, comprising:
    frequency-axis processing means for performing predetermined processing on transmission data on a frequency axis such that a zero signal and/or an inverted signal is inserted between transmission signals of the transmission data on a time axis; and
    time-axis transform means for transforming the transmission data processed by the frequency-axis processing means into a time-axis signal,
    wherein the frequency-axis processing means comprise copying means for copying the transmission data on the frequency axis, and
    the time-axis transform means process the transmission data and the copied transmission data in parallel.

11. The data transmission device according to claim 10, wherein the time-axis transform means transform the transmission data processed by the frequency-axis processing means into the time-axis signal by using inverse fast Fourier transform processing, and
    the copying means determine a first number of points that are assigned to the transmission data such that data of both the transmission data and the copied transmission data correspond to a second number of points that is a number of carriers used in the inverse fast Fourier transform processing.

12. The data transmission device according to claim 10, wherein the copying means adjust a number of copies of the transmission data generated by the copying means.

13. The data transmission device according to claim 10, wherein the copying means assign frequency bands each having a substantially same width to the transmission data and the copied transmission data, respectively.

14. A data transmission device, comprising:
    frequency-axis processing means for performing predetermined processing on transmission data on a frequency axis such that a zero signal and/or an inverted signal is inserted between transmission signals of the transmission data on a time axis; and time-axis transform means for transforming the transmission data processed by the frequency-axis processing means into a time-axis signal, wherein the frequency-axis processing means comprise delay finite-difference means for delaying the transmission signal, and subtracting the delayed transmission signal from the transmission signal.

15. The data transmission device according to claim 14, wherein the delay finite-difference means use a decreased roll-off rate in frequency characteristics of the frequency-axis processing means.

16. The data transmission device according to claim 15, wherein in the frequency characteristics, a band width is about 25 MHz, and the decreased roll-off rate is about 20%.

* * * * *